United States Patent
Hishida et al.

(10) Patent No.: US 7,289,914 B2
(45) Date of Patent: Oct. 30, 2007

(54) ULTRASONIC FLOWMETER AND ULTRASONIC FLOWMETERING METHOD

(75) Inventors: Koichi Hishida, Kanagawa (JP); Yasushi Takeda, Hokkaido (JP); Michitsugu Mori, Tokyo (JP)

(73) Assignees: Keio University, Tokyo (JP); The Tokyo Electric Power Company, Incorporated, Tokyo (JP)

( * ) Notice: Subject to any disclaimer, the term of this patent is extended or adjusted under 35 U.S.C. 154(b) by 15 days.

(21) Appl. No.: 10/514,234

(22) PCT Filed: May 22, 2003

(86) PCT No.: PCT/JP03/06421

§ 371 (c)(1),
(2), (4) Date: Nov. 19, 2004

(87) PCT Pub. No.: WO03/100357

PCT Pub. Date: Dec. 4, 2003

(65) Prior Publication Data

US 2005/0241411 A1 Nov. 3, 2005

(30) Foreign Application Priority Data

May 24, 2002 (JP) .............................. 2002-150398

(51) Int. Cl.
  *G06F 19/00* (2006.01)
  *G01F 1/66* (2006.01)
(52) U.S. Cl. ..................................... 702/39; 73/861.27

(58) Field of Classification Search .................. 702/39, 702/45, 48, 50, 54, 100, 46–47, 55; 73/861.25, 73/861.18, 861.19, 861.23, 861.26, 861.27
See application file for complete search history.

(56) References Cited

U.S. PATENT DOCUMENTS 3,813,939 A * 6/1974 Head ........................ 73/861.06
4,019,038 A * 4/1977 Critten et al. ............... 708/425

(Continued)

FOREIGN PATENT DOCUMENTS

EP 0 426 309 A2 5/1991

(Continued)

OTHER PUBLICATIONS

Pavlovic et al., Realization of the Ultrasonic Liquid Flowmeter Based on the Pulse-Phase Method, 1997, Ultrasonics 35, pp. 87-102.*

(Continued)

*Primary Examiner*—Bryan Bui
*Assistant Examiner*—Toan M. Le
(74) *Attorney, Agent, or Firm*—Oblon, Spivak, McClelland, Maier & Neustadt, P.C.

(57) ABSTRACT

An ultrasonic flowmeter casts an ultrasonic pulse toward a measurement line ML, processes ultrasonic echo signals, and calculates the position and speed of each ultrasonic reflector positioned along the measurement line ML by analyzing the ultrasonic echo signals subjected to signal processing. The flowmeter filters the ultrasonic echo signals. A trigger oscillator of the flowmeter controls signal transmission/reception timing according to an adjustable sequence wherein one cycle is formed of three consecutive sets of emissions of an ultrasonic pulse and reception of ultrasonic echo signals, and a waiting period of time.

12 Claims, 9 Drawing Sheets

U.S. PATENT DOCUMENTS

| | | | |
|---|---|---|---|
| 4,528,857 A * | 7/1985 | Bruner | 73/861.18 |
| 5,503,035 A * | 4/1996 | Itoh et al. | 73/861.23 |
| 5,650,571 A * | 7/1997 | Freud et al. | 73/861.06 |
| 5,741,980 A * | 4/1998 | Hill et al. | 73/861.04 |
| 5,777,892 A * | 7/1998 | Nabity et al. | 702/143 |
| 5,932,812 A * | 8/1999 | Delsing | 73/861.02 |
| 6,067,861 A | 5/2000 | Shekarriz et al. | 73/861.25 |
| 6,196,973 B1 | 3/2001 | Lazenby et al. | 600/458 |
| 6,234,016 B1 | 5/2001 | Bonne et al. | 73/204.26 |
| 6,378,357 B1 | 4/2002 | Han et al. | 73/54.41 |
| 6,535,835 B1 * | 3/2003 | Rubin et al. | 702/159 |
| 6,575,043 B1 * | 6/2003 | Huang et al. | 73/861.25 |
| 6,587,796 B2 * | 7/2003 | Fukuhara | 702/45 |
| 6,609,069 B2 * | 8/2003 | Gysling | 702/48 |
| 6,758,100 B2 * | 7/2004 | Huang | 73/861.25 |
| 6,915,704 B2 * | 7/2005 | Umekage et al. | 73/861.27 |
| 6,917,887 B2 * | 7/2005 | Henry et al. | 702/45 |
| 6,928,369 B2 * | 8/2005 | Kishimoto et al. | 702/45 |
| 6,931,945 B2 * | 8/2005 | Takeda et al. | 73/861.25 |
| 6,941,821 B2 * | 9/2005 | Umekage et al. | 73/861.27 |
| 2005/0241411 A1 | 11/2005 | Hishida et al. | |
| 2005/0245827 A1 | 11/2005 | Takeda et al. | |

FOREIGN PATENT DOCUMENTS

| | | |
|---|---|---|
| JP | 5-87608 | 4/1993 |
| JP | 2000-97742 | 4/2000 |

OTHER PUBLICATIONS

U.S. Appl. No. 10/555,640, filed Nov. 04, 2005, Hishida et al.

* cited by examiner

ULTRASONIC FLOWMETER AND ULTRASONIC FLOWMETERING METHOD

TECHNICAL FIELD

The present invention relates to an ultrasonic flowmeter for measuring the flow of a fluid using ultrasonic pulses, particularly to an ultrasonic flowmeter for measuring various kinds of fluids including a relatively clean fluid, in a non-contact manner.

BACKGROUND ART

As a conventional technique, an doppler ultrasonic flowmeter using the ultrasonic pulsed doppler method has been known as disclosed in Japanese Unexamined Patent Application Publication No. 2000-97742.

The doppler ultrasonic flowmeter has a configuration wherein ultrasonic pulses are cast onto a measurement line within a flow tube, ultrasonic echo signals, i.e., the reflected-wave signals from suspended fine particles in a fluid flowing in the fluid tube are analyzed so as to calculate the flow of the fluid flowing along the measurement line based upon the positions and velocities of the suspended fine particles. The measurement line is formed by an ultrasonic-pulse beam cast from the transducer.

The doppler ultrasonic flowmeter may be applied to an opaque fluid and an opaque-fluid tube, as well as having the advantage of measuring the flow of a fluid flowing a fluid tube in a non-contact manner. Furthermore, the doppler ultrasonic flowmeter has the advantage of measurement of the flow-speed distribution of an opaque fluid and the flow thereof, e.g., measurement of the flow of liquid metal such as mercury, sodium, and so forth, as well as having functions for measuring the flow-speed distribution and the flow of a fluid flowing in the flow tube with measurement along the measurement line.

The doppler ultrasonic flowmeter has the advantage of detecting change in the flow-speed distribution over time along the measurement line formed by the ultrasonic pulses cast onto the fluid from the transducer, and accordingly, it is hoped that the doppler ultrasonic flowmeter can be applied to measurement of a transient flow of a fluid flowing through the flow tube, and measurement of the flow-speed distribution and measurement of the flow in a turbulent situation.

An arrangement example of the ultrasonic flowmeter described above is disclosed in Japanese Unexamined Patent Application Publication No. 2000-97742.

Measurement with a conventional doppler flowmeter requires a situation wherein a fluid flowing in a flow tube which is to be measured contains a number of ultrasonic reflectors such as suspended fine particles or bubbles, and such ultrasonic reflectors continuously flow along the measurement line (formed by an ultrasonic beam). If the fluid flowing along the measurement line formed by the transducer does not contain any ultrasonic reflectors, dead time occurs for measurement of flow-speed distribution of the fluid, leading to a problem of deterioration in precision of measurement of the fluid-flow speed and measurement of the fluid flow.

Furthermore, while the conventional doppler ultrasonic flowmeter has a configuration wherein ultrasonic echo signals, i.e., the reflected-wave signals from ultrasonic reflectors are analyzed through signal processing so as to calculate the fluid-flow speed or the fluid flow, the signal processing method for the conventional doppler ultrasonic flowmeter has the disadvantage that a number of ultrasonic pulses must be repeatedly cast onto the fluid for calculating a single fluid-flow-speed distribution. The conventional doppler ultrasonic flowmeter having a configuration wherein ultrasonic pulses are repeatedly cast onto a fluid has the disadvantage of low time resolution, e.g., around 10 msec at the best, leading to difficulty in precise measurement of the fluid flow in a situation wherein a transient flow or a turbulent flow occurs in the fluid flow in the flow tube.

The present invention has been made in order to solve the aforementioned problems, and accordingly, it is an object thereof to provide an ultrasonic flowmeter which allows precise measurement of the fluid flow with improved time resolution even if a transient flow or a turbulent flow occurs in a flow tube.

Furthermore, it is another object of the present invention to provide an ultrasonic flowmeter having a function for storing the positional data and the speed data of ultrasonic reflectors, thereby allowing precise measurement of the fluid flow even in a situation wherein ultrasonic reflectors discontinuously and intermittently flow along the measurement line in the fluid flow which is to be measured.

DISCLOSURE OF INVENTION

In order to solve the aforementioned problems, an ultrasonic flowmeter according to the present invention as disclosed in Claim 1 comprising: a trigger oscillating unit for outputting trigger signals; a pulse receiver for outputting ultrasonic pulse oscillation signals according to the trigger signals from the trigger oscillating unit; a transducer for casting ultrasonic pulses along a measurement line in a fluid according to the ultrasonic pulse oscillation signals from the pulse receiver; a signal processing unit for receiving ultrasonic echo signals corresponding to a reflected wave from an ultrasonic reflector suspended in the fluid, due to an ultrasonic pulse cast from the transducer, and for performing signal processing for the ultrasonic echo signals; and a signal analyzing unit for calculating the position and speed of the ultrasonic reflector positioned along the measurement line by performing signal analysis for ultrasonic echo signals subjected to signal processing by the signal processing unit, with the trigger oscillating unit controlling signal transmission/reception timing between the pulse receiver and an AD converter, and with one cycle of the signal transmission/reception timing being formed of multiple consecutive sets of ultrasonic pulse oscillation and ultrasonic echo signal reception, and a predetermined waiting period of time, is adjustable.

Furthermore, in order to solve the aforementioned problems, with an ultrasonic flowmeter according to the present invention as disclosed in Claim 2, the signal processing unit comprises: a pulse receiver for receiving ultrasonic echo signals corresponding to a reflected wave due to an ultrasonic pulse, from the transducer; the pulse receiver including a filtering processing member for selecting ultrasonic echo signals in a frequency range corresponding to the ultrasonic oscillation frequency range of the transducer; and an AD converter for performing AD conversion of ultrasonic echo signals from the pulse receiver, and with the signal analyzing unit comprising: a flow-speed distribution calculating member for calculating the phase difference by making cross-correlation between a pair of digitized ultrasonic echo signals so as to calculate the flow-speed distribution of the ultrasonic reflectors, thereby calculating the speed distribution of the fluid containing the ultrasonic reflectors suspended therein; and a flow calculating member for calculating the flow of the fluid based upon the flow-speed distribution thus calculated.

Furthermore, in order to solve the aforementioned problems, with an ultrasonic flowmeter according to the present invention as disclosed in Claim 3, the signal analyzing unit includes a flow-speed calculating member for analyzing the phase difference of signals by making cross-correlation between a pair of digitized ultrasonic echo signals so as to calculate the flow-speed distribution of the ultrasonic reflectors, thereby calculating the flow-speed distribution containing the ultrasonic reflectors suspended therein.

Furthermore, in order to solve the aforementioned problems, with an ultrasonic flowmeter according to the present invention as disclosed in Claim 4, the signal analyzing unit sets a threshold value for the amplitude of digitized ultrasonic echo signals in order to discriminate a reflected wave from noise, select ultrasonic echo signals having the amplitude greater than the threshold value as a reflected wave, and make cross-correlation between a pair of selected ultrasonic echo signals, as well as setting a threshold value for a correlation value obtained by performing cross-correlation in order to confirm that the pair of selected ultrasonic echo signals correspond to the same ultrasonic reflector; in the event of the correlation value greater than the threshold value, determination is made that the pair of ultrasonic echo signals correspond to the same ultrasonic reflector, phase difference therebetween is calculated, and the flow-speed distribution of the ultrasonic reflector is calculated based upon the phase difference thus obtained.

Furthermore, in order to solve the aforementioned problems, with an ultrasonic flowmeter according to the present invention as disclosed in Claim 5, the signal analyzing unit includes a flow-speed distribution calculating member and a flow measurement member having a function for setting a threshold value for the amplitude of digitized ultrasonic echo signals in order to discriminate a reflected wave from noise, and a threshold value for a correlation value obtained by performing cross-correlation in order to confirm that the pair of selected ultrasonic echo signals correspond to the same ultrasonic reflector, with the threshold values being optimized corresponding to the amount of the ultrasonic reflectors in the fluid which is to be measured.

Furthermore, in order to solve the aforementioned problems, with an ultrasonic flowmeter according to the present invention as disclosed in Claim 6, the signal analyzing unit includes a flow-speed distribution calculating member and a flow measurement member having a function for calculating a discrete cross-correlation function with the same pitch as the time interval for sampling the reflected wave, based upon the ultrasonic signals, with cross-correlation function being calculated using the sine-wave approximation with finer meshes for handling reduction of the discrete pitch At which has the advantage of obtaining consecutive ultrasonic pulse-shaped reflected waves in generally the same shape from the same tracer particle group.

Furthermore, in order to solve the aforementioned problems, with an ultrasonic flowmeter according to the present invention as disclosed in Claim 7, the pulse receiver corrects irregularities in timing between the trigger time where a trigger signal is input and the signal emission time where an ultrasonic pulse oscillation signal is output, by making cross-correlation between the emission areas contained in the pair of ultrasonic echo signals due to refection from the emission area, i.e., by performing digital trigger processing.

Furthermore, in order to solve the aforementioned problems, with an ultrasonic flowmeter according to the present invention as disclosed in Claim 8, the trigger oscillating unit sets a sequence wherein one cycle is formed of multiple consecutive sets of emission of an ultrasonic pulse and reception of ultrasonic echo signals, and a predetermined waiting period of time, thereby improving time resolution.

Furthermore, in order to solve the aforementioned problems, with an ultrasonic flowmeter according to the present invention as disclosed in Claim 9, measurement of the flow-speed distribution is made using one of three kinds of measurement methods of the continuous pulse method, the double pulse method, and the triple pulse method, by varying the number of the consecutive pulses of the trigger signals oscillated by the trigger oscillating unit and the waiting period of time.

Furthermore, in order to solve the aforementioned problems, with an ultrasonic flowmeter according to the present invention as disclosed in Claim 10, the trigger oscillating trigger unit generates external trigger signals, and the external trigger signals are output to the pulse receiver and the AD converter so as to control timing of signal transmission and reception between the pulse receiver and the AD converter.

An ultrasonic flow measurement method according to the present invention as disclosed in Claim 11 comprises: a trigger oscillating step for generating trigger signals; an ultrasonic pulse emitting step for emitting ultrasonic pulses to a fluid to be measured so as to be cast therein; an ultrasonic echo signal generation step for generating ultrasonic echo signals by converting received reflected wave into electric signals; a signal processing step for performing signal processing for the ultrasonic echo signals; a signal analysis step for analyzing the ultrasonic echo signals; and a display step for displaying at least one of the flow-speed distribution and the flow measurement results, according to selection made by the user.

Furthermore, in order to solve the aforementioned problems, with an ultrasonic flow measurement method according to the present invention as disclosed in Claim 12, the signal analysis step comprises: a flow-speed calculation step for calculating the flow-speed distribution of ultrasonic reflectors based upon the position and speed of each of ultrasonic reflectors suspended in fluid, thereby calculating the flow-speed distribution of the fluid; and a flow calculation step for calculating the flow of the fluid based upon the flow-speed distribution thereof.

Furthermore, in order to solve the aforementioned problems, with an ultrasonic flow measurement method according to the present invention as disclosed in Claim 13, the signal analysis step comprises a flow-speed calculation step for calculating the flow-speed distribution of ultrasonic reflectors based upon the position and speed of each of ultrasonic reflectors suspended in fluid, thereby calculating the flow-speed distribution of the fluid.

Furthermore, in order to solve the aforementioned problems, with an ultrasonic flow measurement method according to the present invention as disclosed in Claim 14, in the flow-speed distribution calculation step, an ultrasonic echo signal having the amplitude greater than a threshold value set for the amplitude of digitized ultrasonic echo signals in order to discriminate a reflected wave from noise, is selected as the reflected wave, as well as making cross-correlation between a pair of selected ultrasonic echo signals; in the event of the calculated correlation value greater than a threshold value set for the correlation value in order to confirm that the ultrasonic echo signals correspond to the same ultrasonic reflectors, determination is made that the ultrasonic echo signals correspond to the same ultrasonic reflectors, and the phase difference therebetween is calculated so as to calculate the flow-speed distribution of the ultrasonic reflector.

Furthermore, in order to solve the aforementioned problems, with an ultrasonic flow measurement method according to the present invention as disclosed in Claim 15, in the flow-speed distribution calculation step, an ultrasonic echo signal having the amplitude greater than a threshold value set for the amplitude of digitized ultrasonic echo signals in order to discriminate a reflected wave from noise, is selected as the reflected wave, as well as making cross-correlation between a pair of selected ultrasonic echo signals.

Furthermore, in order to solve the aforementioned problems, with an ultrasonic flow measurement method according to the present invention as disclosed in Claim 16, in the flow-speed distribution calculation step, a correlation value between the pair of ultrasonic echo signals is calculated based upon the discrete cross-correlation function with the same pitch as the time interval for sampling the reflected wave, as well as calculating cross-correlation function using the sine-wave approximation with finer meshes for handling reduction of the discrete pitch Δt which has the advantage of obtaining consecutive ultrasonic pulse-shaped reflected waves in generally the same shape from the same tracer particle group.

Furthermore, in order to solve the aforementioned problems, with an ultrasonic flow measurement method according to the present invention as disclosed in Claim 17, in the trigger oscillation step, a sequence is set wherein one cycle is formed of multiple consecutive sets of emission of an ultrasonic pulse and reception of ultrasonic echo signals, and a predetermined waiting period of time.

Furthermore, in order to solve the aforementioned problems, with an ultrasonic flow measurement method according to the present invention as disclosed in Claim 18, external trigger signals are employed as the trigger signals.

Furthermore, in order to solve the aforementioned problems, with an ultrasonic flow measurement method according to the present invention as disclosed in Claim 19, in the trigger oscillation step, the number of the consecutive pulses of the trigger signals and the waiting period of time are controlled, and the continuous pulse method, the double pulse method, or the triple pulse method, is carried out.

BRIEF DESCRIPTION OF THE DRAWINGS

FIG. 9 shows diagrams for describing timing for applying the trigger signal used for measurement of the flow-speed distribution of fluid and measurement of the flow thereof made by the ultrasonic flowmeter according to the present invention, wherein FIG. 9(A) shows the conventional pulse doppler method, FIG. 9(B) shows the continuous pulse method, FIG. 9(C) shows the double pulse method, and FIG. 9(D) shows the triple pulse method.

Figure 1:
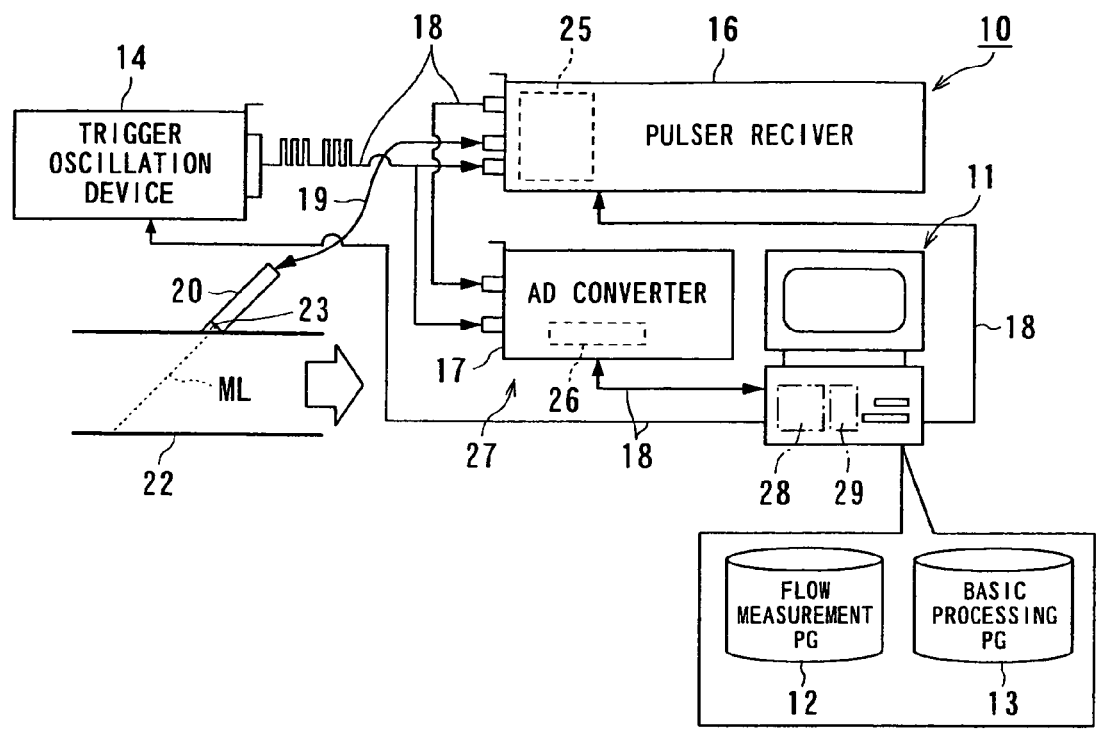
FIG. 1 is a schematic diagram which shows an ultrasonic flowmeter according to an embodiment of the present invention, which is applied to a test arrangement.

REFERENCE NUMERALS 10 ultrasonic flowmeter
11 personal computer
12 ultrasonic flow measurement PG
13 basic processing PG
14 trigger oscillator (trigger oscillating unit)
15, 18, 19 connector cable (signal transmission line)
16 pulse receiver
17 AD converter
20 transducer
21 fluid which is to be measured (measured fluid)
22 fluid tube 22a acrylic tube
23 acoustic coupler
25 filtering processing member
26 memory
27 signal processing unit
28 flow-speed distribution calculating member
29 flow calculating member
35 tracer particle (ultrasonic reflector)
36 ultrasonic beam

BEST MODE FOR CARRYING OUT THE INVENTION

Description will be made regarding an ultrasonic flowmeter according to an embodiment of the present invention with reference to the drawings.

[Measurement System]

FIG. 1 is a schematic configuration diagram which shows the schematic configuration of a measurement system according to an embodiment of the present invention.

An ultrasonic flowmeter 10 has a configuration wherein a personal computer 11 having the functions of a "computer" (which will be referred to as a "personal computer" hereafter) reads out and executes a flow measurement program (which will be referred to as "flow measurement PG, as well as "program" being abbreviated to "PG") 12 and a basic processing PG 13 for controlling each device connected to the personal computer 11 and performing computation processing required for measurement of the flow-speed distribution and measurement of the flow, whereby the personal computer 11 and the devices connected to the personal computer 11 have functions serving as an ultrasonic flowmeter.

The flow measurement PG 12 is a program which is executed by the personal computer 11 for performing computation processing directly regarding flow measurement. On the other hand, while the basic processing PG 13 has no functions directly regarding flow measurement, the basic processing PG 13 is executed by the personal computer 11 for performing computation processing required for displaying the measurement results on display means such as a monitor or the like of the personal computer 11, i.e., for performing computation processing accessory to flow measurement. The flow measurement PG 12 and the basic processing PG 13 stored in the personal computer 11 allow the personal computer to read out and execute the flow measurement PG 12 and the basic processing PG 13.

The ultrasonic flowmeter 10 includes the personal computer 11, a trigger oscillator 14 serving as a emission trigger oscillating unit, a pulse receiver 16 connected to the trigger oscillator 14 through a connector cable 15 serving as a signal transmission line, and an AD converter 17 for performing analog/digital conversion (which will be referred to as "AD conversion" hereafter), wherein the personal computer 11, the trigger oscillator 14, the pulse receiver 16, and the AD converter 17, are connected one to another through a connector cable 18.

Furthermore, while the ultrasonic flowmeter 10 requires a control PG for controlling the trigger oscillator 14, the pulse receiver 16, and the AD converter 17, which are connected to the personal computer 11, for performing flow-speed-distribution measurement and flow measurement, the control PG is included in the basic processing program 13 stored beforehand.

The trigger oscillator 14 of the ultrasonic flowmeter 10 generates trigger signals, and transmits the generated trigger signals to the pulse receiver 16 and the AD converter 17 for controlling the signal receiving timing of the pulse receiver 16 and the AD converter 17. The personal computer 11 executes the predetermined basic processing PG 13 so as to control the trigger oscillator 14, thereby allowing the user to design a desired waveform of the trigger signal.

The pulse receiver 16 is connected to a transducer 20 through a connector cable 19 serving as a signal transmission line, and has functions serving as ultrasonic pulse oscillation signal means for: receiving the trigger signals (electric signals) transmitted from the trigger oscillator 14 through the connector cable 15; generating ultrasonic pulse oscillation signals (electric signals); and outputting the ultrasonic pulse oscillation signals to the transducer 20. Furthermore, the pulse receiver 16 includes a built-in digital synthesizer which allows output of ultrasonic pulse oscillation signals in a frequency range of 50 kHz to 20 MHz, and thus, the pulse receiver 16 is suitably employed for the transducer 20 having various frequency properties.

On the other hand, the transducer 20 connected to the pulse receiver 16 has functions serving as ultrasonic pulse oscillation means for converting the ultrasonic pulse oscillation signals output from the pulse receiver 16 into ultrasonic pulses, and casting the ultrasonic pulses thus converted along the measurement line ML. The transducer 20 is disposed on the outer wall of a flow tube 22 where a fluid 21 which is to be measured is introduced, at a predetermined setting angle θ. In general, the transducer 20 is disposed on the outer wall through an acoustic coupler 23 for matching the acoustic impedance of the transducer 20 with that of the fluid tube 22.

The ultrasonic pulse is cast onto the object 21 which is to be measured, i.e., the fluid 21 flowing in the fluid tube 22, and is reflected by suspended ultrasonic reflectors (contained in the fluid 21). The reflected wave is returned to the transducer 20, i.e., received by the transducer 20.

That is to say, the transducer 20 has functions serving as ultrasonic pulse receiving means for converting the received reflected wave into the ultrasonic echo signal (electric signal) corresponding to the magnitude thereof, as well as serving as ultrasonic echo signal generating means. Subsequently, the ultrasonic echo signal is transmitted to the pulse receiver 16.

The pulse receiver 16 includes a filtering processing member 25 for removing noise components superimposed on the ultrasonic echo signals. The filtering processing member 25 includes a low-pass filter and a high-pass filter, or a band-pass filter, for performing filtering processing for the ultrasonic echo signals, i.e., the reflected wave signals, thereby extracting ultrasonic pulse signals in a useful frequency range. The aforementioned filtering processing for the ultrasonic echo signals suppresses adverse effects on measurement to a minimum. That is to say, the pulse receiver 16 has functions serving as a signal processing unit for performing signal processing for ultrasonic echo signals, as well as serving as ultrasonic echo signal receiving means for receiving the ultrasonic echo signals, i.e., the reflected wave signals due to the ultrasonic pulse.

Subsequently, the analog ultrasonic echo signals subjected to filtering processing by the pulse receiver 16 are transmitted to the AD converter 17, and the analog ultrasonic echo signals are converted into digital signals by the AD converter 17. That is to say, the AD converter 17 has a function for obtaining digital ultrasonic echo signals by performing high-speed digital sampling processing for the ultrasonic echo signals corresponding to a reflected wave.

The digital data converted by the AD converter 17 is stored in built-in memory 26 included in the AD converter 17. The data stored in the memory 26 can be read out by the personal computer 11. The data thus read out can be stored in a recording medium having a function for storing digital data, such as a built in hard disk, or the like, for example. Note that the AD converter 17 has the resolution of 8 bits, for example. In this case, the AD converter 17 exhibits frequency of 500 MHz, at best.

The AD converter 17 has functions for converting analog input signals into digital output signals while performing signal processing for the digital signals thus output, by the personal computer 11 reading out and executing the control program for controlling the AD converter 17, thereby enabling real-time display of the flow-speed distribution.

The filtering processing member 25 of the aforementioned pulse receiver 16 and the AD converter 17 forms signal processing unit 27. The signal processing unit 27 performs signal processing for the ultrasonic echo signals, i.e., the reflected wave signals due to the ultrasonic pulse. The ultrasonic echo signals subjected to signal processing are analyzed by a flow-speed-distribution calculating member 28 serving as a signal analyzing unit, thereby calculating the positions and the speed of the aforementioned ultrasonic reflectors, or the position and the speed of a group formed of the aforementioned ultrasonic reflectors.

The flow-speed distribution calculating member 28 calculates the position and the speed of each ultrasonic reflector or the position and the speed of a group of the ultrasonic reflectors, and performs computation processing on the assumption that the position and the speed thus calculated match the position and the speed of the fluid 21, thereby obtaining the flow-speed distribution of the fluid 21 flowing within the fluid tube 22. The flow-speed distribution calculating member 28 is built-in computation processing means included in the personal computer 11, and performs computation processing for the digital data read out from the AD converter 17, thereby calculating the position and the speed of each ultrasonic reflector or the position and the speed of a group formed of the ultrasonic reflectors.

The flow-speed distribution data of the fluid 21 calculated by the flow-speed distribution calculating member 28 is input to a flow calculating member 29 serving as the signal analyzing unit. The flow calculating member 29 is built-in computation processing means included in the personal computer 11 as with the flow-speed calculating member 28. The flow calculating member 29 performs computation processing for the flow-speed distribution data of the fluid 21, whereby the flow is calculated. The flow-speed distribution and the flow thus calculated are output and displayed on display means such as a monitor of the personal computer 11 or the like.

While description has been made regarding an arrangement wherein the built-in computation processing means included in the personal computer 11 are employed as the flow-speed distribution calculating member 28 and the flow calculating member 29, an arrangement may be made wherein other computation processing means such as a workstation, mainframe, or the like, are employed for the aforementioned computation processing. For example, an arrangement may be made wherein the memory 26 of the AD converter 17 has computation processing functions required for the aforementioned computation processing, i.e., the memory 26 has functions serving as the flow-speed distribution calculating member 28.

Furthermore, the ultrasonic flowmeter 10 may has a configuration wherein the personal computer 11 has only functions serving as the flow-speed distribution calculating member 28, and calculates only the flow-speed distribution of the fluid. Furthermore, an arrangement may be made wherein both of measurement results, i.e., the flow-speed distribution and the flow, are not always displayed at the same time, and at least one of the measurement results, i.e., the flow-speed distribution and the flow, is displayed according to selection, made by the user.

Furthermore, an arrangement may be made wherein the flow-speed distribution calculating member 28 includes the flow calculating member 29. That is to say, an arrangement may be made wherein the flow-speed calculating member 28 has functions for calculating the flow of the fluid as well as the flow-speed distribution thereof.

On the other hand, while description has been made wherein the PGs required for calculating the flow-speed distribution of the fluid and the flow thereof such as the flow measurement PG 12, the basic processing PG 13, and the like, are stored in the personal computer 11, an arrangement may be made wherein an external device stores the PGs, and the personal computer 11 reads out and executes the PGs. Note that in a case wherein the ultrasonic flowmeter is used only as a flow-speed distribution meter without function for calculating the flow of the fluid, the flow-distribution measurement PG may be employed as the flow measurement PG 12.

While description has been made regarding an arrangement wherein each of the trigger oscillator 14, the pulse receiver 16, and the AD converter 17, are separate devices from the personal computer 11, the present invention is not restricted to the aforementioned arrangement. For example, an arrangement may be made wherein the trigger oscillator 14, the pulse receiver 16, and the AD converter 17, are connected to a built-in mother board included in the personal computer 11 in the form of a trigger oscillation board, a pulse-receiver board, and an AD converter board, respectively, whereby such functions are included within the personal computer 11. Furthermore, an arrangement may be made wherein the aforementioned trigger oscillation board, the pulse receiver board, and the AD converter board, are integrated on a single board.

[Measurement of Flow of Fluid]

Next, description will be made regarding measurement procedures for measuring the flow of a fluid with the ultrasonic flowmeter 10 and the operation thereof.

Figure 2A:
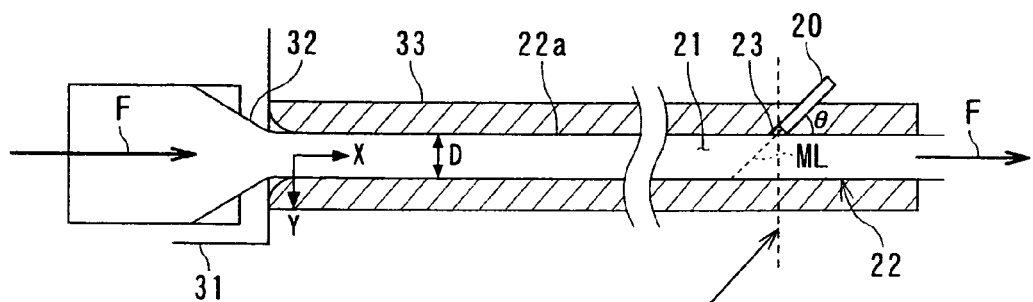
FIG. 2(A) is a schematic cross-sectional plan view of a fluid tube where the ultrasonic flowmeter shown in FIG. 1 is mounted.
Figure 2B:
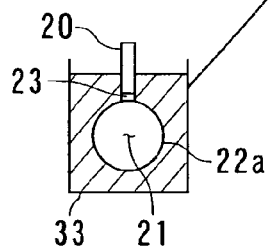
FIG. 2(B) is a cross-sectional view which shows the test area shown in FIG. 2(A).

In order to make description regarding measurement of the flow of the fluid 21 which is to be measured with the ultrasonic flowmeter 10, let us consider a test arrangement wherein an acrylic tube 22a with an internal diameter of 44 mm is employed as the fluid tube 22, and the transducer 20 is disposed on the outer wall of the fluid tube 22 at a position of 19D (which is 19 times as great as the internal diameter D) from the tube start position along the tube axis direction (X direction) as shown in FIG. 2(A) and FIG. 2(B).

The transducer 20 is disposed on the acrylic tube 22a through which the fluid 21 that is to be measured flows so as to be situated in water at a predetermined angle (setting angle) θ. The transducer 20 is disposed on the fluid tube 22 through the acoustic coupler 23, thereby enabling smooth propagation of the ultrasonic pulses cast from the transducer 20 in the acrylic tube 22a.

Reference numeral 31 denotes an overflow tank, reference numeral 32 denotes a flow-contraction portion, and reference numeral 33 denotes a fluid-tube setting container for setting the acrylic tube 22a serving as a test region in water. Note that with the present test arrangement, water is employed as the fluid which is to be measured. Note that reference character F in the drawing denotes the direction of the flow of water.

The ultrasonic flowmeter 10 has a configuration wherein the signal processing unit 27 performs signal processing using the cross-correlation method, i.e., flow measurement is made using the method wherein the flow-speed distribution of the fluid is calculated along the measurement line ML based upon at least two reflected waves measured at a predetermined time interval, thereby drastically improving the time resolution as compared with the conventional doppler ultrasonic flowmeters.

However, with the aforementioned method, the data of the reflected waves consecutively measured at extremely short time intervals are stored in the AD converter 17, and calculation is made for the data. Accordingly, with the aforementioned method, calculation is made for a large amount of data of the reflected waves, leading to a problem of a long-period of time for acquisition of the reflected-wave data and calculation thereof, resulting in difficulty in real-time display of the flow-speed distribution of the fluid. Accordingly, with the present arrangement, measurement is made with as small an amount of data of the reflected waves as possible. Specifically, data acquisition is performed from consecutive two or three reflected waves for each display step. Upon display of the flow-speed distribution, the following acquisition of the reflected waves is performed.

The procedure of the fluid flow measurement method performed by the ultrasonic flowmeter 10 comprises: a trigger signal oscillation step for oscillating trigger signals; an ultrasonic pulse transmission step for casting the ultrasonic pulse onto the fluid 21 which is to be measured; an ultrasonic echo signal acquisition step for converting the received reflected wave into electric signals, thereby generating ultrasonic echo signals; a signal processing step for performing signal processing for the ultrasonic echo signals; and a display step for displaying at least one of the measurement results, i.e., the flow-speed distribution of the fluid and the flow thereof, according to selection made by the user.

With the fluid-flow-measurement method performed by the ultrasonic flowmeter 10, first, the trigger oscillator 14 generates trigger signals (electric signals) in the trigger signal oscillation step, and the trigger signals thus generated are output to the pulse receiver 16 and the AD converter 17. Upon input of the trigger signal to the pulse receiver 16, the pulse receiver 16 performs ultrasonic pulse generating processing in the ultrasonic pulse transmission step, i.e., the ultrasonic pulse oscillation signals thus generated are transmitted from the pulse receiver 16 to the transducer 20.

Upon the transducer 20 receiving the ultrasonic pulse oscillation signals, the transducer 20 performs ultrasonic pulse oscillation processing in the ultrasonic pulse transmission step, i.e., the ultrasonic pulse oscillation signals are converted into ultrasonic burst signals in the form of a sine curve with a frequency of 4 MHz, for example, whereby emission of the ultrasonic pulse is made. Upon emission of the ultrasonic pulse, the ultrasonic pulse casting processing is performed in the ultrasonic pulse transmission step, i.e., the oscillated ultrasonic pulse is cast onto the fluid which it to be measured, from the transducer 20.

The transducer 20 casts an ultrasonic pulse beam (which will be referred to as "ultrasonic beam" hereafter) onto the fluid tube 22, as well as receiving the reflected waves from ultrasonic reflectors such as bubbles or particles contained in the fluid 21 which is to be measured after casting of the ultrasonic beam. Furthermore, the ultrasonic flowmeter 10 performs ultrasonic echo signal acquisition step for generating ultrasonic echo signals corresponding to the magnitude of the received reflect waves.

The ultrasonic echo signals due to reflected waves obtained in the ultrasonic echo signal acquisition step are transmitted to the pulse receiver 16. Then, the filtering processing member 25 of the pulse receiver 16 performs filtering processing for the received ultrasonic echo signals in the signal processing step, thereby extracting the singles in an ultrasonic frequency range used for measurement. Then, the ultrasonic echo signals subjected to filtering processing are output to the AD converter 17. The AD converter 17 performs high-speed digital sampling processing for the received ultrasonic echo signals subjected to filtering processing, whereby AD conversion is performed in the signal processing step.

The ultrasonic echo signals subjected to filtering processing and AD conversion in the signal processing step are subjected to signal analysis in the signal analysis step. In the signal analysis step, the flow-speed distribution of ultrasonic reflectors is calculated based upon the position and the speed of each of the aforementioned ultrasonic reflectors suspended in the fluid. Note that the signal analysis step comprises a flow-speed distribution calculating step for calculating the flow-speed distribution of the fluid 21, and the flow calculating step for calculating the flow of the fluid 21 based upon the flow-speed distribution thereof.

In the flow-speed distribution calculating step in the signal analysis step, the ultrasonic flowmeter 10 calculates the cross-correlation between two digitized echo signals consecutively received at an extreme short time interval, e.g., at a time interval of 1 µs, with the cross-correlation method, whereby the two positions of the same ultrasonic reflector are detected for each reflector from two ultrasonic echo signals consecutively received, and the displacement (phase difference) between the positions is calculated for each ultrasonic reflector. Then, the ultrasonic flowmeter 10 calculates the flow-speed distribution of the aforementioned ultrasonic reflector group suspended in the fluid based upon the time difference and phase difference between two ultrasonic echo signals.

Subsequently, in the flow calculating step, the ultrasonic flowmeter 10 calculates the flow of the fluid based upon the flow-speed distribution calculated in the flow-speed distribution calculating step, whereby the flow of the fluid is measured. Specifically, the flow of the fluid is calculated by integrating the flow-speed distribution of the fluid over the inner area of the acrylic tube 22a.

Thus, the fluid flow measurement method performed by the ultrasonic flowmeter 10 allows the user to easily make measurement of the flow of a fluid with high precision, as well as obtaining the flow-speed distribution of the fluid 21 flowing within the fluid tube 22 along the measurement line ML.

Figure 3:
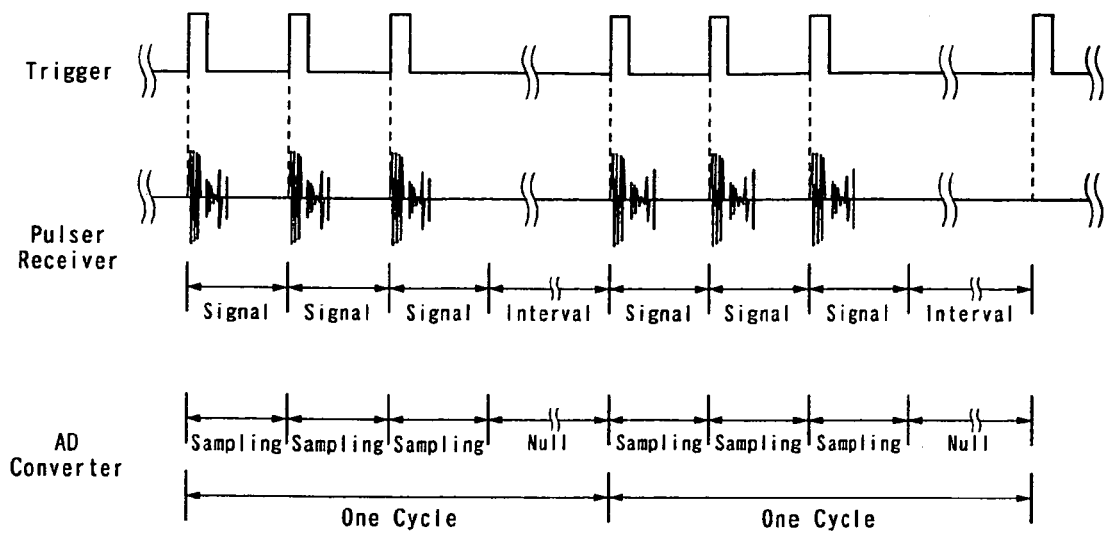
FIG. 3 is an explanatory diagram for describing signal transmission/reception timing between a trigger oscillator, a pulse receiver, and an AD converter, performed according to trigger signals with the continuous pulse method (triple pulse method) in measurement of the flow-speed distribution and measurement of the flow, made by the ultrasonic flowmeter according to the present invention.

FIG. 3 is an explanatory diagram for describing signal transmission/reception timing between the trigger oscillator 14, the pulse receiver 16, and the AD converter 17.

The ultrasonic flowmeter 10 has a configuration wherein the trigger oscillator 14 determines signal transmission/reception timing between the pulse receiver 16 and the AD converter 17. FIG. 3 shows an example of the signal transmission/reception timing between the trigger oscillator 14, the pulse receiver 16, and the AD converter 17. As shown in FIG. 3, one cycle is formed of multiple consecutive actions each of which are executed in a short period of time and are formed of transmission of a pulse-shaped trigger signal, reception of signals, and sampling of data, and a predetermined waiting period of time (interval). The ultrasonic flowmeter 10 controls the signal transmission/reception timing so as to repeat the aforementioned cycle. Note that the waiting time (interval) thus set greatly improves the time resolution.

Figure 4:
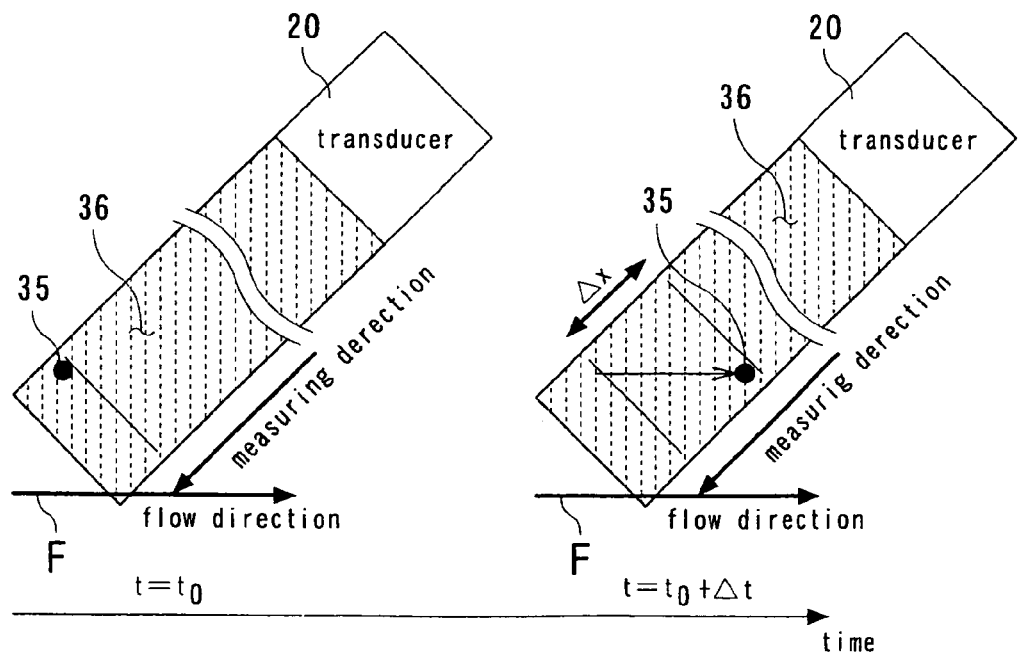
FIG. 4 is a diagram for describing a mechanism of measurement of the flow-speed distribution and measurement of the flow made by the ultrasonic flowmeter according to the present invention, and is an explanatory diagram for describing displacement of a tracer particle (ultrasonic reflector) within the flow tube between two points in time.
Figure 5:
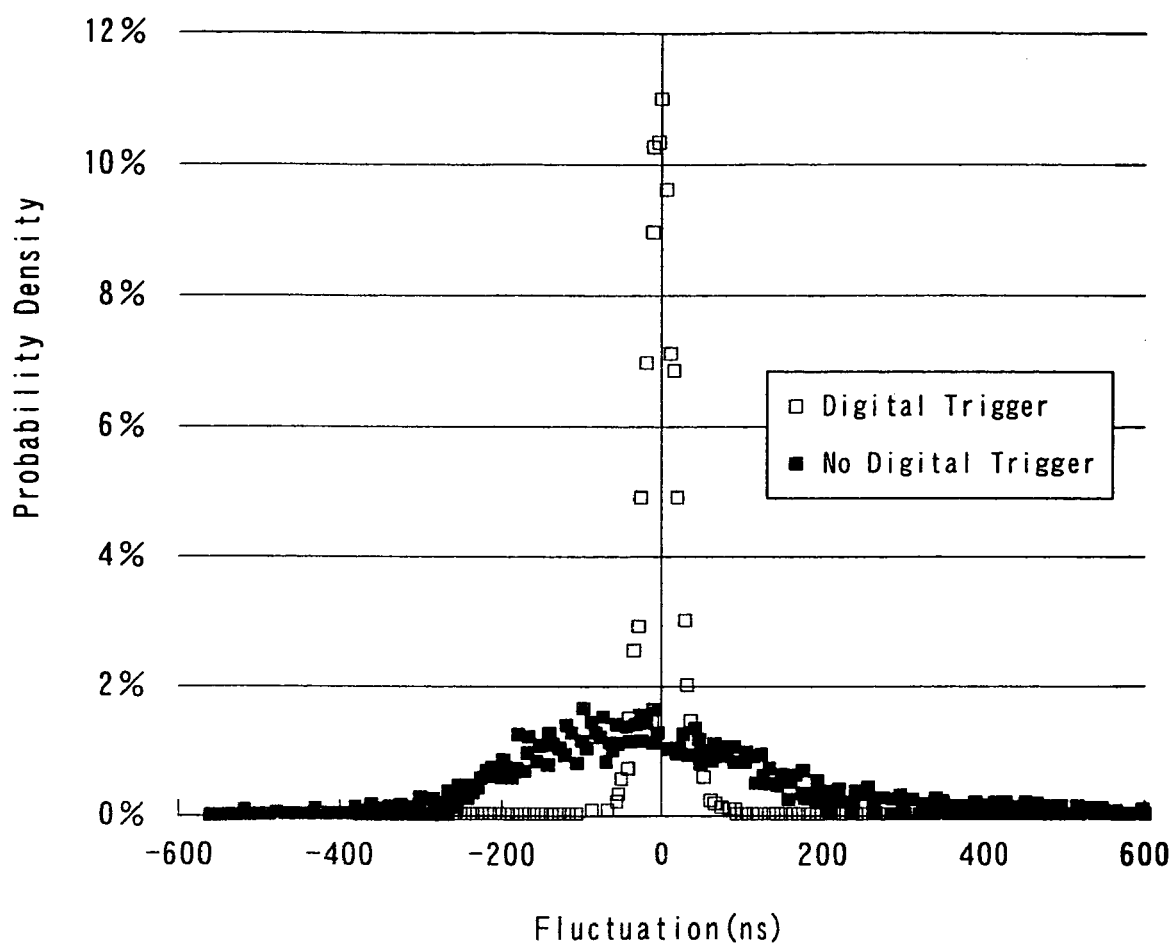
FIG. 5 is an explanatory diagram for showing comparison of the probability density distribution between an arrangement with correction (digital trigger processing) of irregularities in timing and an arrangement without such correction; the probability density distribution representing irregularities in timing between the trigger time at which a trigger signal is input to the pulse receiver and the signal emission time at which a signal is output from the pulse receiver, i.e., is an explanatory diagram for describing the advantage in the aforementioned digital trigger processing.

On the other hand, the conventional ultrasonic flowmeters have a mechanism wherein the displacement of each tracer particle (ultrasonic reflector) 35 is calculated by analyzing the ultrasonic echo signals as shown in FIG. 4. However, the conventional ultrasonic flowmeters have a problem of irregularities in timing between the input point in time (trigger time) for inputting the trigger signal to the pulse receiver 16 and the signal transmission point in time for transmitting the ultrasonic echo oscillation signal, as shown in FIG. 5. Furthermore, only displacement of the tracer particle in a predetermined range is calculated with sufficient precision by signal processing. In this case, error due to irregularities in timing of signal transmission due to the pulse receiver 16, inherent in the hardware configuration thereof, leads to a great problem of measurement precision.

In order to solve the aforementioned problem, the ultrasonic flowmeter 10 has a mechanism wherein cross-correlation is made between the consecutive two ultrasonic echo signals with a part of the waveform thereof where great amplitude is observed due to immediate reflection of the ultrasonic burst signal (reflected wave from the emission area) so as to correct deviation of timing for transmitting the ultrasonic burst signal (digital trigger processing) using the fact that the aforementioned part of the waveform exhibits the same signal shape for each timing regardless of transmission point in time.

FIG. 5 is a chart of the probability density distribution for describing difference in irregularities in timing of signal transmission for transmitting the ultrasonic burst signal between a case without digital trigger processing and a case with digital trigger processing.

As can be understood from FIG. 5, digital trigger processing suppresses irregularities in timing of signal transmission for transmitting the ultrasonic burst signal, to ¼ of those without digital trigger processing. Furthermore, in a case of the digital trigger processing, transmission of the ultrasonic burst signal with time deviation of zero occurs with the greatest probability. With the present ultrasonic flowmeter 10, deviation of timing for transmitting the ultrasonic burst signal is corrected by the digital trigger processing, thereby greatly reducing irregularities in timing of signal transmission. Thus, the digital trigger processing improves precision of flow measurement.

[Measurement Principle of Ultrasonic Flowmeter]

Let us consider a test arrangement as shown in FIG. 2, wherein the transducer 20 of the ultrasonic flowmeter 10 is mounted on the acrylic tube 22a put in water, and water 21 serving as fluid containing the tracer particles serving as ultrasonic reflectors are introduced into the acrylic tube 22a so as to pass through, whereby the flow-speed distribution of the fluid is measured.

Figure 6:
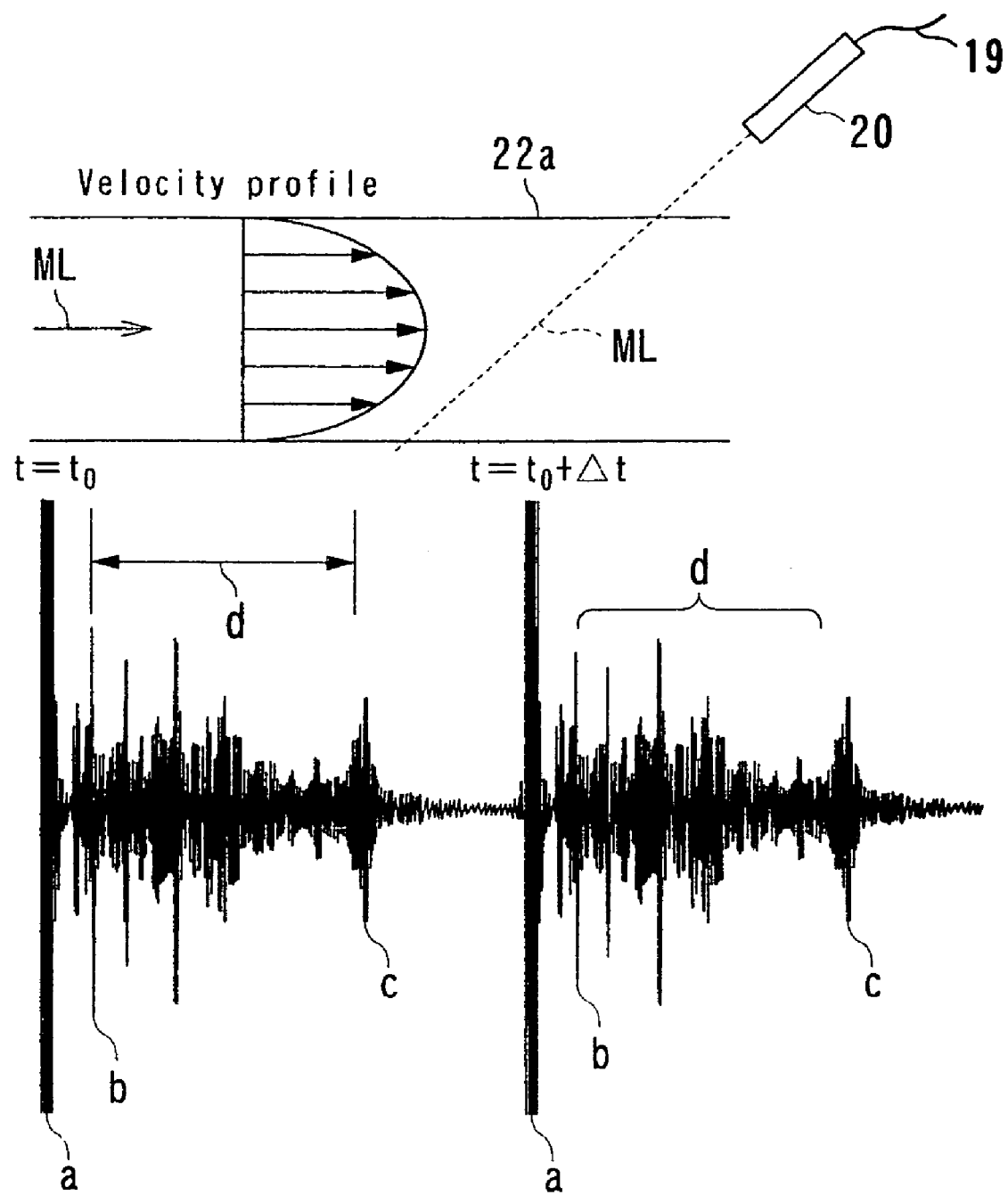
FIG. 6 is an explanatory diagram for describing an ultrasonic echo signal corresponding to a reflected wave due to an ultrasonic pulse emitted from a transducer of the ultrasonic flowmeter according to the present invention.
Figure 7:
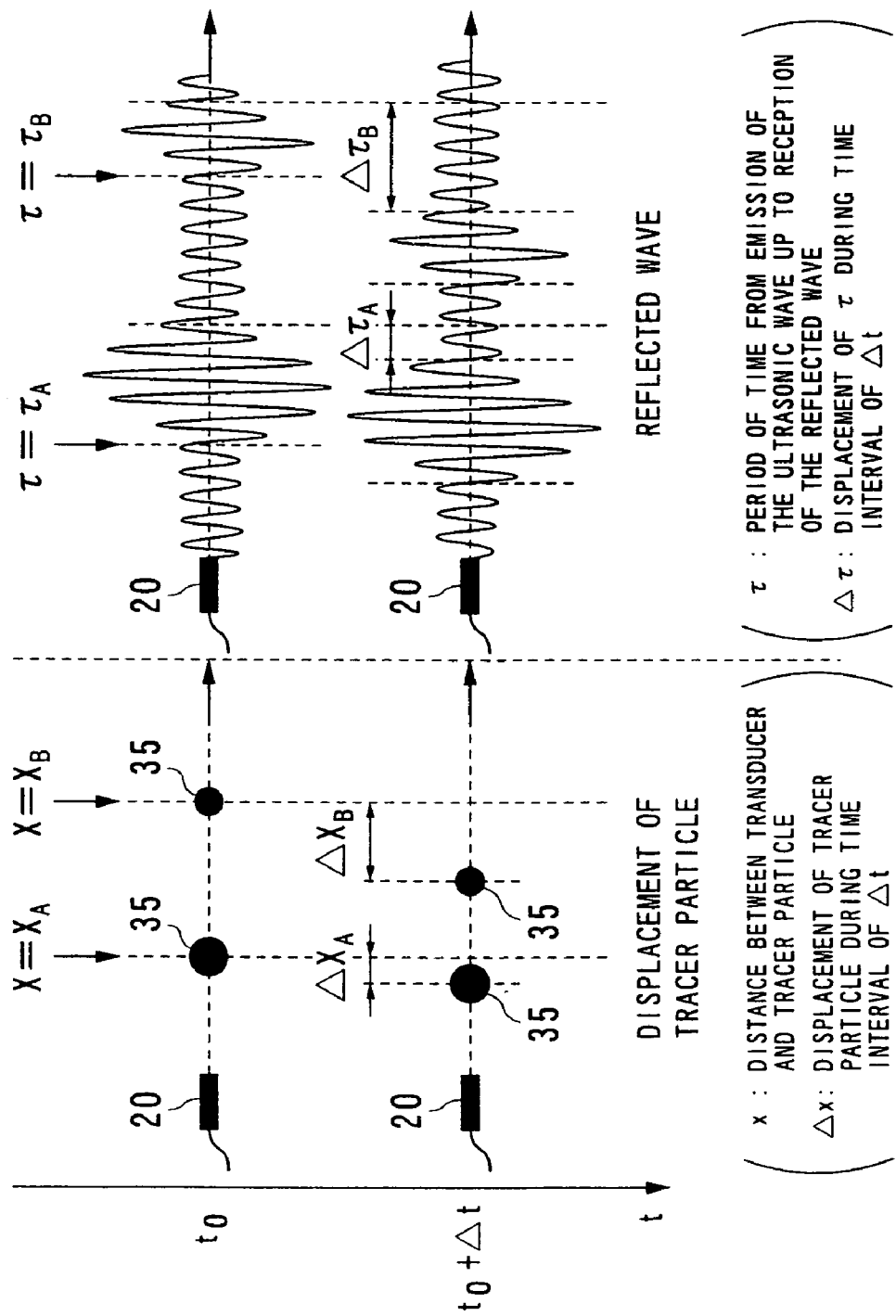
FIG. 7 is a diagram for describing a mechanism of measurement of the flow-speed distribution and measurement of the flow, made by the ultrasonic flowmeter according to the present invention, i.e., an explanatory diagram for describing the displacement of the tracer particle between $t=t_0$ and $t=t_0+\Delta t$, and change in the reflected wave over time.

At the time of measurement of the flow-speed distribution of the fluid, the piezo device of the transducer 20 oscillates so as to generate ultrasonic pulses, and the ultrasonic pulse thus generated by oscillation is cast toward the water along the measurement line ML. Then, the ultrasonic pulse thus generated by oscillation is reflected by the surface of the tracer particle 35 serving as an ultrasonic reflector, and returns to the transducer 20. Such reflection occurs at various positions within the flow of the fluid within the acrylic tube 22a. Accordingly, the reflected waves are observed as shown in FIG. 6.

The first observed ultrasonic burst signal (ultrasonic echo signal) "a" is referred to as "emission area", which occurs due to remaining vibration of the piezo device immediately following emission of ultrasonic waves. The next observed ultrasonic burst signal "b" occurs at the upper portion of the fluid tube due to difference in the acoustic impedance between the water 21 serving as fluid which is to be measured and the acrylic tube 22a formed of acrylic resin. On the other hand, the ultrasonic burst signal "c" occurs at the lower portion of the fluid tube due to the same mechanism as with the ultrasonic burst signal "b". On the other hand, the ultrasonic burst signal "d" positioned between the ultrasonic burst signals "b" and "c" contains the information regarding the flow speed of the fluid passing through the acrylic tube 22a. Specifically, each peak in the signal "d" corresponds to the tracer particle 35.

The position of each tracer particle 35 is calculated based upon the ultrasonic burst signal "d" due to the reflected wave. With the distance between the transducer 20 and the tracer particle 35 as x, and with the period of time from emission of the ultrasonic pulse up to reception of the reflected wave as τ, and with the speed of the ultrasonic wave as c, the following Expression (1) holds.

[Expression 1]

$$x = \frac{c\tau}{2} \qquad \qquad \Lambda\Lambda\ (1)$$

The emission of an ultrasonic pulse and reception of a reflected wave are performed again at a time interval of Δt, whereby a similar reflected wave is obtained. In this case, the fluid 21 moves during the time interval of Δt, and accordingly, each tracer particle 35 moves following the water, leading to displacement of the period of time τ from emission of the ultrasonic wave up to reception of the reflected wave.

With the displacement of the period of time τ from emission of the ultrasonic wave up to reception of the reflected wave as Δτ, the speed u(x) at a certain position x along the x direction is represented by the following Expression (2).

[Expression 2]

$$u(x) = \frac{\Delta x}{\Delta t} = \frac{c \cdot \Delta \tau}{2 \cdot \Delta t} \qquad \qquad \Lambda\Lambda\ (2)$$

Here, Δx represents the displacement of the tracer particle 35 during a certain time interval Δt.

Reflection of the ultrasonic pulse occurs at various positions along the measurement line ML, and accordingly, the ultrasonic flowmeter 10 allows the user to make flow measurement of the fluid for the multiple points along the measurement line ML at the same time, thereby obtaining the flow-speed distribution of the fluid.

Note that with measurement of the flow-speed distribution using the consecutive pulse method wherein consecutive n (n represents an integer of 2 or more) pulses are cast onto the fluid at time intervals of Δt, consecutive (n-1) flow-speed distribution data sets are obtained with time resolution of Δt.

[Cross-Correlation Function]

The reflected waves having generally the same shape are obtained from the same tracer particle 35 serving as an ultrasonic reflector with consecutive measurement at a sufficiently small time interval $\Delta t$. Note that it is assumed that the flow of the fluid is generally constant during the sufficiently small time interval $\Delta t$.

The pulse receiver 16 of the ultrasonic flowmeter 10 shown in FIG. 1 converts analog ultrasonic echo signals due to the reflected wave into digital signals by high-speed sampling processing of the AD converter 17, following which cross-correlation function is calculated between the two reflected waves (the preceding reflected wave serving as a reference wave and the following reflected wave after $\Delta t$ serving as a searching wave) obtained by the consecutive measurement at an ultrasonic-pulse emission interval of $\Delta t$. Then, the ultrasonic flowmeter 10 sets a predetermined threshold value which allows determination whether or not the two reflected waves are reflected from the same ultrasonic reflector within the fluid. Thus, the ultrasonic flowmeter 10 determines whether or not the two reflected waves are reflected from the same tracer particle group based upon the reasonable value, i.e., the cross-correlation function with the threshold value.

In general, the cross-correlation function $R(\epsilon, \tau)$ is defined as the following expression.

[Expression 3]

$$R(\varepsilon, \tau) = \frac{\sum_{i=-m/2}^{m/2} (A_{ref}(\tau+i) - \overline{A_{ref}(\tau)})(A_{int}(\tau+i+\varepsilon) - \overline{A_{int}(\tau+\varepsilon)})}{\sqrt{\sum_{i=-m/2}^{m/2} (A_{ref}(\tau+i) - \overline{A_{ref}(\tau)})^2} \sqrt{\sum_{i=-m/2}^{m/2} (A_{int}(\tau+i+\varepsilon) - \overline{A_{int}(\tau+\varepsilon)})^2}} \quad \wedge \wedge \ (3)$$

wherein $$\overline{A_{ref}(\tau)} = \frac{\sum_{i=-m/2}^{m/2} A_{ref}(\tau+i)}{m} \quad \wedge \wedge \ (4)$$

$$\overline{A_{int}(\tau+\varepsilon)} = \frac{\sum_{i=-m/2}^{m/2} A_{ref}(\tau+i+\varepsilon)}{m} \quad \wedge \wedge \ (5)$$

Here, $\tau$ represents the basic time lag, i represents the position within a reference window and a search window, $\epsilon$ represents the displacement between the reference window and the search window, and m represents the number of divisions of the ultrasonic pulse.

Determination is made whether or not the two reflected waves have been reflected from the same tracer particle group based upon the reasonable value, i.e., the cross-correlation function $R(\epsilon, \tau)$, and the time lag $\tau$ is obtained for each of the two reflected waves, thereby obtaining the difference (time difference) in the time lag $\tau$ between the two reflected waves, i.e., $\Delta \tau$. That is to say, the time lag is obtained for each of the first detected reflected wave and the next reflected wave, thereby obtaining $\Delta \tau$ which is the difference (time difference) in time lag between the two reflected waves.

Thus, the difference in point in time at which the reflected wave has reached the pulse receiver 16 between the two reflected waves, $\Delta \tau$, is calculated using the cross-correlation function of the reflected-wave signals obtained by digital sampling.

The cross-correlation function $R(\epsilon, \tau)$ is a discrete function at the same pitch as the sampling pitch for the reflected wave. On the other hand, the shorter the time interval $\Delta t$ is, the more similar the shapes of the two pulse-shaped reflected waves from the same tracer particle group are to each another. In this case, $\Delta \tau$ must be calculated with finer meshes.

In order to handle such measurement with a shorter interval $\Delta \tau$, an arrangement may be made wherein $\Delta \tau$ is calculated with the interpolation method using sine-wave approximation. The interpolation enables calculation of the peak of the cross-correlation function with finer meshes, thereby improving resolution of speed.

With the maximum correlation value selected from the discrete correlation values as $P_k$, and with the correlation values adjacent to the maximum correlation value as $P_{k-1}$ and $P_{k+1}$, $\Delta \tau$ is calculated using the interpolation method as represented by the following Expression.

[Expression 4]

$$\Delta \tau = k + \frac{1}{2}\left(\frac{\log(P_{k-1}) - \log(P_{k+1})}{\log(P_{k-1}) - 2\log(P_k) + \log(P_{k+1})}\right) \quad \wedge \wedge \ (6)$$

The ultrasonic flowmeter according to the present invention has the aforementioned function wherein signal processing is performed with the interpolation using sine-wave approximation, as well as the functions according to Claim 2 through Claim 4, thereby drastically improving resolution of speed.

[Setting of Threshold Values for Amplitude of Reflected Wave and Correlation Value]

With actual measurement of the flow-speed distribution or actual measurement of the flow, in some cases, the ultrasonic flowmeter 10 calculates false information regarding the position and speed of the tracer particle by analyzing the reflected-wave signals. In order to solve the aforementioned problem, the false information regarding the position and speed of the tracer particle is rejected using the thresholds for the amplitude and the correlation value. Description will be made below regarding setting of the threshold values for the amplitude of the reflected wave and the correlation value.

As the first reason why the ultrasonic flowmeter 10 obtains the false information regarding the position and speed of the tracer particle is assumed as follows. That is to say, the ultrasonic flowmeter 10 recognizes a signal portion (meaningless signal) which does not correspond to actual reflection as the reflected wave signal (meaningful signal) from the ultrasonic pulse. In other words, the ultrasonic flowmeter 10 recognizes a meaningless signal which contains no information regarding the position and speed of the tracer particle, as a reflected-wave signal (meaningful signal).

In order to solve the aforementioned problem, the ultrasonic flowmeter 10 sets a threshold value for the amplitude of the reflected wave (search wave) using the fact that the signal portion (meaningful signal) containing the information regarding the position and speed of the tracer particle tends to have a greater amplitude than with the signal portion (meaningless signal) containing no information regarding the position and speed of the tracer particle. Then, the ultrasonic flowmeter 10 calculates the cross-correlation between the reference wave and the search wave only in a case wherein the amplitude of the search wave is greater than the predetermined threshold value. Conversely, in a case wherein the amplitude of the search wave is less than the predetermined threshold value, the ultrasonic flowmeter 10 rejects the signal portion as a meaningless signal. As described above, the ultrasonic flowmeter 10 discriminates the meaningful signal containing the information regarding the position and speed of the tracer particle, from the meaningless signal containing no information.

As the second reason why the ultrasonic flowmeter 10 obtains the false information regarding the position and speed of the tracer particle is assumed as follows. That is to say, the ultrasonic flowmeter 10 determines that the reflected wave from one tracer particle group contained in the reference wave corresponds to the reflected wave from the other tracer particle group contained in the search wave based upon calculation results of cross-correlation between the reference wave and the search wave. In order to solve the aforementioned problem, the ultrasonic flowmeter 10 sets the threshold value for the correlation value obtained by calculation of cross-correlation between the reference wave and the search wave. Furthermore, measurement is made at sufficiently small time intervals Δt. In a case wherein measurement is made at sufficiently small time intervals Δt, the two reflected waves consecutively detected exhibit generally the same shape. This allows cross-correlation calculation with a threshold value near 1, thereby allowing the ultrasonic flowmeter 10 to extract the reflected waves contained in the reference wave and the search wave, which correspond one to another, with higher precision.

As described above, the ultrasonic flowmeter 10 has functions for extracting the reflected waves contained in the reference wave and the search wave, which correspond to the same tracer particle, using the predetermined threshold set for the amplitude of the reflected wave and the correlation value. Then, the ultrasonic flowmeter 10 calculates the phase difference between the extracted reflected waves contained in the search wave and the reference wave, which correspond to the same tracer particle group, following which the position and the speed of the tracer particle group are calculated based upon the phase difference thus obtained, whereby the flow-speed distribution of the fluid 21 which is to be measured and the flow thereof are measured. Furthermore, an arrangement may be made wherein the ultrasonic flowmeter 10 sets the threshold values for the amplitude of the reflected wave and the correlation value for each reflected wave, and signal analysis is performed for the reflected waves (contained in the reference wave and search wave) using the threshold thus determined, thereby improving reliability of measurement of the flow-speed distribution of the flow and reliability of measurement of the flow thereof.

[Introduction of Emission Trigger]

FIG. 1 is a schematic diagram which shows the measurement system which was used for a test. The measurement system controls the pulse receiver 16 for oscillation and reception of sine-wave ultrasonic pulses, and the AD converter 17 for performing AD conversion of the ultrasonic echo signals, using external trigger signals.

Note that the external trigger signals used here does not mean the trigger signals oscillated by a built-in CPU included within the personal computer 11, but means trigger signals oscillated by a unit other than the CPU. For example, the ultrasonic flowmeter 10 shown in FIG. 1 uses trigger signals oscillated by the trigger oscillator 14. Note that the external trigger signals used here include trigger signals oscillated by a trigger oscillation board serving as a trigger oscillating unit provided within the personal computer, i.e., trigger signals oscillated by the trigger oscillator 14 serving as the trigger oscillating unit provided within the personal computer 11.

On the other hand, setting of the sampling frequency of the AD converter 17 to be in the order of several hundred MHz leads to difficulty in operation thereof strictly according to the trigger signals, leading to irregularities in sampling frequency. Accordingly, the ultrasonic flowmeter 10 according to the present invention uses the emission area where reflection occurs immediately following emission of the ultrasonic pulse from the transducer 20. That is to say, the ultrasonic flowmeter 10 calculates cross-correlation between the emission area of the first received reflected wave as a reference wave and the emission area of the second received reflected wave as a search wave so as to calculate the difference in time lag, i.e., Δτ. Furthermore, before calculation of cross-correlation, the ultrasonic flowmeter 10 performs interpolation for Δτ with the sine-wave approximation, thereby correcting Δτ. Note that following correction using data with the same time intervals as with the sampling pitch of the reflected wave, small irregularities in time due to the trigger signals from the trigger oscillator 14 are corrected for each point on the measurement line with finer meshes than with the sampling pitch.

Figure 8:
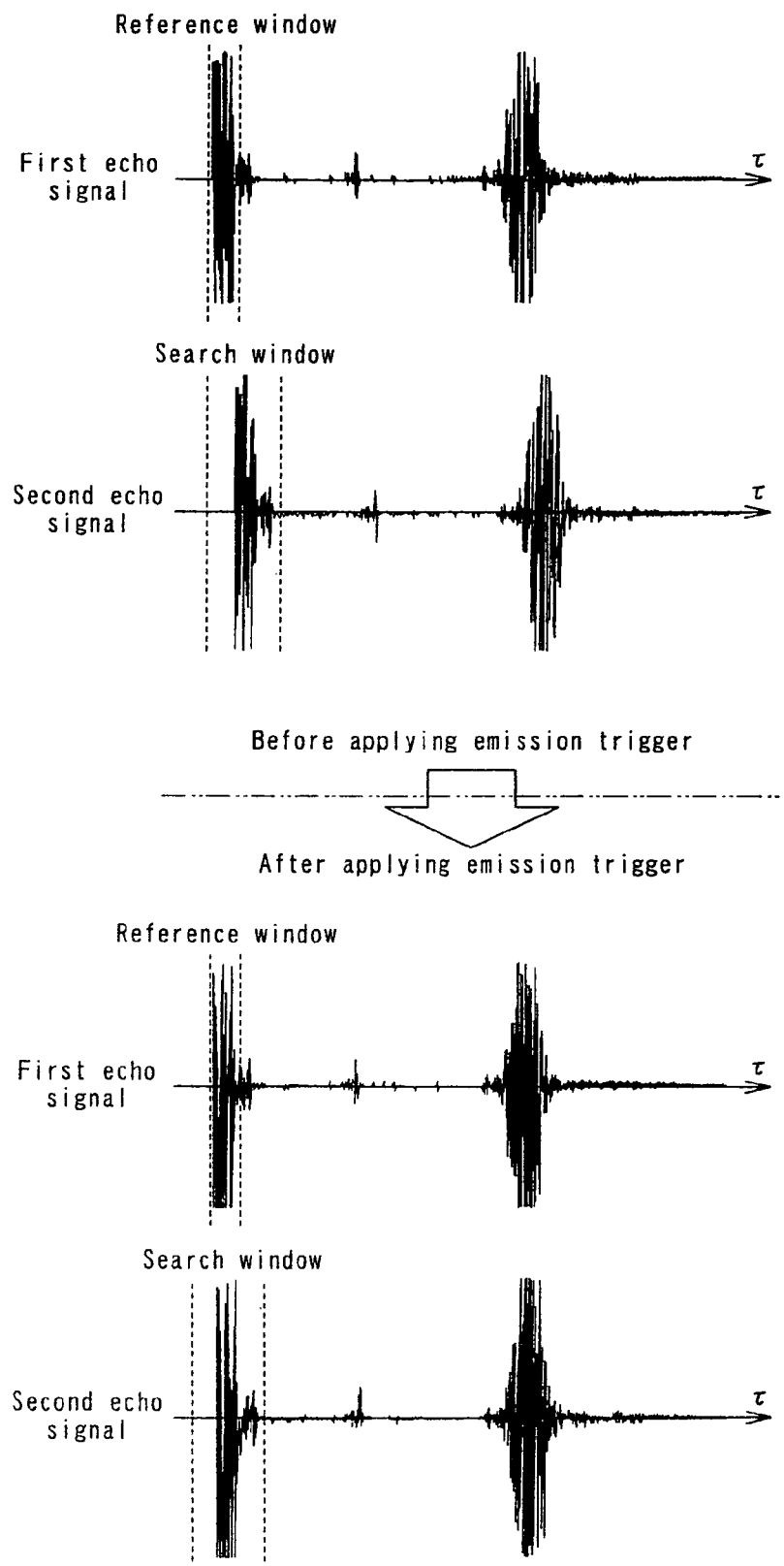
FIG. 8 is an explanatory diagram for describing the advantage in using emission trigger applied to irregularities in timing between the reference wave and the search wave at the time of measurement of the flow-speed distribution and measurement of the flow, with reference to comparison between an arrangement without the emission trigger and an arrangement with the emission trigger.

FIG. 8 is an explanatory diagram for describing deviation of time between the reference wave and the search wave at the time of measurement of the flow-speed distribution and measurement of the flow using the ultrasonic flowmeter 10, with reference to comparison between an arrangement with emission trigger and an arrangement without emission trigger.

As can be understood from FIG. 8, the deviation of time between the reference wave and the search wave, which is apparent in an arrangement without emission trigger, is corrected in an arrangement with emission trigger. That is to say, it has been confirmed that the emission trigger makes effective correction.

[Trigger Interval]

Figure 9:
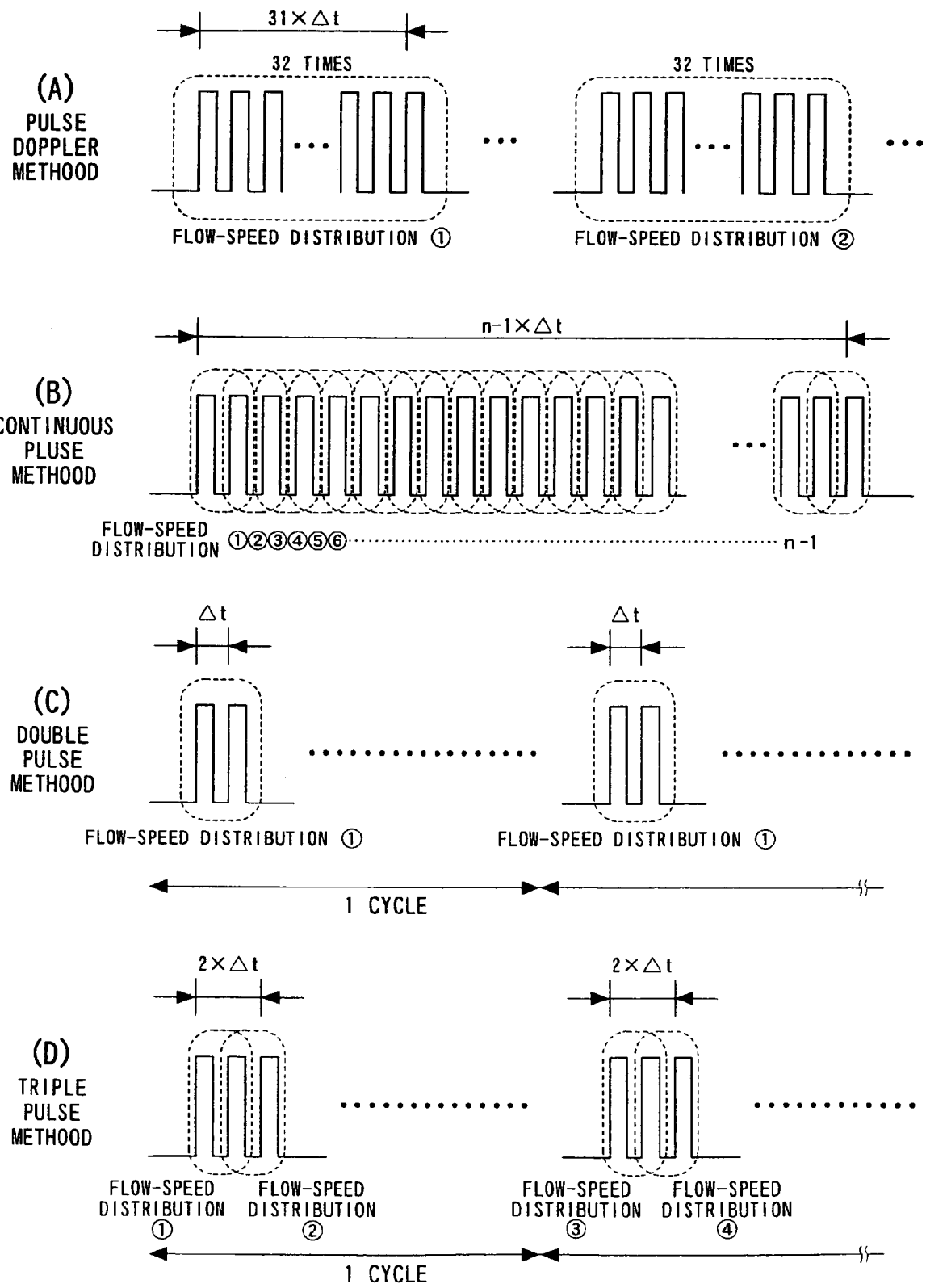

The ultrasonic flowmeter 10 may have a function for varying types of the trigger signals applied by the trigger oscillator 14 as shown in FIG. 9. For example, the ultrasonic flowmeter 10 selects the type of the trigger signals from the trigger signals as shown in FIG. 9(B), FIG. 9(C), and FIG. 9(D), so as to perform the continuous pulse method, the double pulse method, and the triple pulse method, respectively, thereby enabling three kinds of measurement of the flow-speed distribution of the fluid and three kinds of measurement of the flow thereof.

With the continuous pulse method, the ultrasonic flowmeter 10 makes measurement of the flow-speed distribution of the fluid and measurement of the flow thereof by casting the continuous pulses as shown in FIG. 9(B) onto the fluid. Note that the number M of consecutive pulses cast onto the fluid is three or more. Note that a special case of the continuous pulse method with the minimum M of 3 is referred to as "triple pulse method" as shown in FIG. 9(D).

The continuous pulse method has the advantage of greatly improving the time resolution as compared with the pulse doppler method shown in FIG. 9(A), thereby enabling measurement with extremely high time resolution of 150 μs, for example. On the other hand, the double pulse method has the advantage of enabling measurement of the flow-speed distribution and measurement of the flow thereof with a small number of tracer particles.

Furthermore, while the pulse doppler method requires a measurement period of time of $31 \times \Delta t$ as shown in FIG. 9(A) on the assumption that the pulse doppler method requires $2^5$ (=32) times of pulse emission for calculating a single distribution, the double pulse method requires only measurement period of time of $\Delta t$, thereby greatly reducing the period of time for measuring the flow-speed distribution, and thereby greatly improving the time resolution.

Now, let us consider the relation between the measurement line ML formed by the transducer 20 and the tracer particle 35. With the setting angle of the transducer 20 on the fluid tube 22 as $\theta$, and with the diameter (effective diameter) of the transducer 20 as D, the condition required for calculating the speed of the single tracer particle 35 is represented as follows. That is to say, with the pulse doppler method, the aforementioned condition is represented by the following Expression.

[Expression 5]

$$x(t+31 \cdot \Delta t) - x(t) \leq \frac{D}{\cos\theta} \qquad \Lambda\Lambda\ (7)$$

On the other hand, with the double pulse method, the aforementioned condition is represented by the following Expression.

[Expression 6]

$$x(t+\Delta t) - x(t) \leq \frac{D}{\cos\theta} \qquad \Lambda\Lambda\ (8)$$

As can be understood from the Expression (7) and Expression (8), the double pulse method has the advantage of enabling measurement of high-speed flow as compared with the pulse doppler method. Furthermore, with the double pulse method, the ultrasonic flowmeter 10 makes cross-correlation one time between the two reflected waves for each measurement, and accordingly, the calculation load is extremely small, thereby facilitating real-time display of the flow-speed distribution of the fluid and the flow thereof.

Figure 10A:
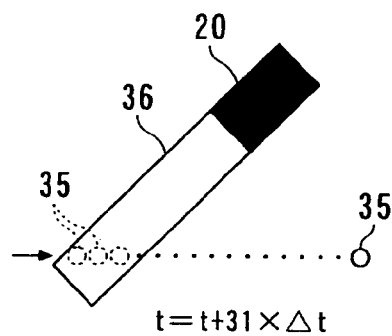
FIG. 10(A) and FIG. 10(B) are explanatory diagrams for describing displacement of the tracer particle on a ultrasonic beam emitted from the transducer with the pulse doppler method and the double pulse method.
Figure 10B:
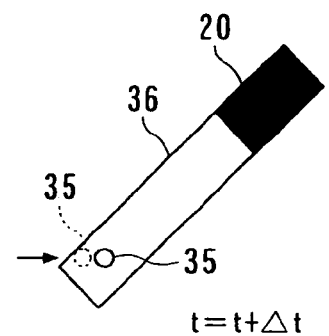

The triple pulse method is a method extended from the double pulse method. The triple pulse method has the same mechanism as with the double pulse method, and has a function for obtaining twice the speed distribution data for each cycle as shown in FIG. 10, thereby enabling measurement of twice the flow-speed distribution data and twice the flow data.

[Time Resolution]

The present invention improves the time resolution of the ultrasonic flowmeter 10 up to around 500 μs to 100 μs, thereby enabling measurement of the flow of the fluid with high precision even if a transient flow or a turbulent flow occurs, or even if an uncontinuous and intermittent flow occurs.

Sometimes, the time resolution of the ultrasonic flowmeter 10 is misunderstood. That is to say, it is often believed that the flowmeter 10 measures the flow of the fluid with the continuous pulse method, the double pulse method, or the triple pulse method, and accordingly, the time resolution thereof matches the period of time required for detecting the two reflected waves. However, in reality, the flowmeter 10 with the continuous pulse method obtains (n-1) flow-speed distribution data sets based upon n reflected waves. That is to say, following reception of the first reflected wave, the flowmeter 10 obtains a new flow-speed distribution data set for each reception of a new reflected wave. Accordingly, the time resolution of the ultrasonic flowmeter 10 is assume to be the period of time for acquisition of one reflected wave at the time of reception of the continuous reflected waves, which is nothing but the oscillation interval $\Delta t$.

[Resolution of Speed and Measurement Limitation]

In principle, the flow speed of the fluid 21 is measured under the measurement condition wherein the sound speed c and $\Delta t$ are constant, and accordingly, the measurement precision of the speed depends upon the measurement precision of $\Delta\tau$. The ultrasonic flowmeter 10 obtains $\Delta\tau$ by making cross-correlation between the two reflected waves obtained by digital sampling as described above. Accordingly, $\Delta\tau$ is obtained as a discrete value with a pitch of an integer. This leads to measurement error of around $\pm 0.5\ t_{samp}$. Note that $t_{samp}$ represents the sampling pitch.

The deviation of the speed corresponding to the sampling pitch, i.e., $u_{samp}$, is calculated by replacing $\Delta\tau$ of the relation between $\Delta\tau$ and u(x) with $t_{samp}$. That is to say, the resolution of speed dv is represented by the following Expression.

[Expression 7]

$$dv \leq \frac{c t_{samp}}{2\Delta t} \qquad \Lambda\Lambda\ (9)$$

Furthermore, an arrangement may be made wherein interpolation is performed for the distribution function, thereby improving the measurement precision of the resolution of speed.

As described above, the ultrasonic flowmeter 10 measures the movement of the ultrasonic reflectors 35 such as tracer particles or the like contained in the fluid by performing signal processing for the displacement of the signals between two points in time using the cross-correlation method as shown in FIG. 4, thereby measuring the flow-speed distribution of the fluid and the flow thereof.

On the other hand, the ultrasonic flowmeter 10 makes measurement of the flow-speed distribution and measurement of the flow thereof according to timing between the boards, i.e., the pulse receiver 16 and the AD converter 17. For example, the timing therebetween is determined by the continuous pulse method as shown in FIG. 3, wherein one cycle is formed of multiple-consecutive sets of pulse oscillation and signal reception, and the following a predetermined waiting period of time.

In this case, the user can adjust the time resolution by setting the waiting period of time. As for the waiting period of time, the personal computer 11 sets the waiting period of time to the value which has been input to the personal computer 11 by the user or the value which has been programmed beforehand by the user, through execution of the basic processing PG 13, thereby allowing the user to adjust the waiting period of time of the trigger signals oscillated by the trigger oscillator 14.

The ultrasonic flowmeter 10 used for the aforementioned test has a function for making measurement with time resolution of approximately 500 μs, thereby achieving time resolution that is tens of times higher than with the conventional ultrasonic flowmeters.

Figure 11:
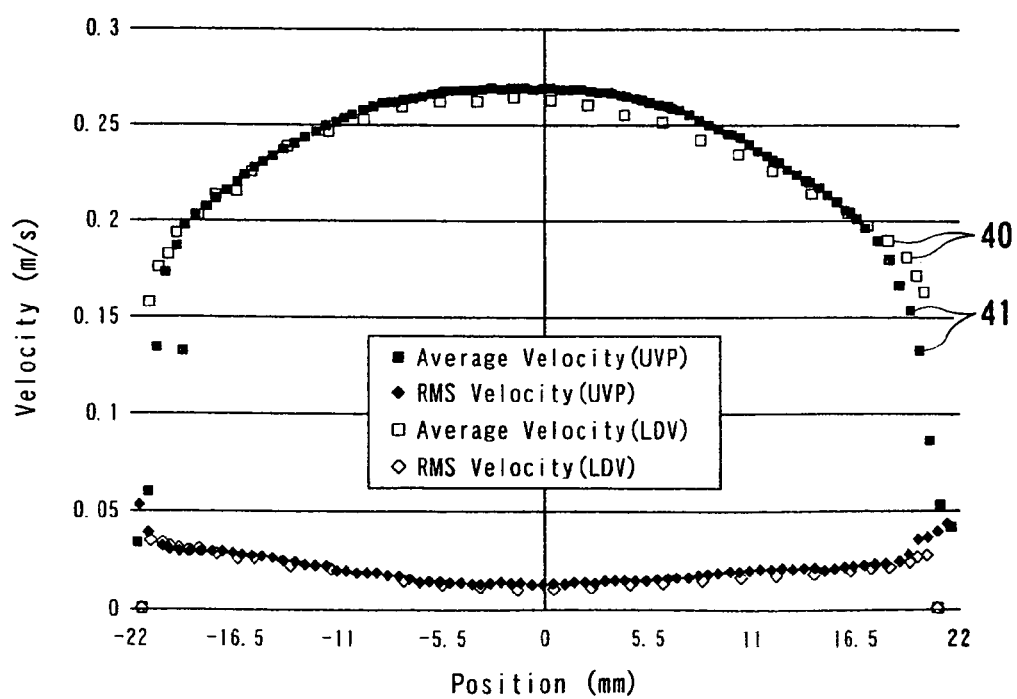
FIG. 11 is an explanatory diagram for describing comparison between the average flow-speed distribution within the fluid tube measured by the ultrasonic flowmeter according to the present invention and the average flow-speed distribution measured by an LDV (Laser Doppler Velocimetry).

FIG. 11 is an explanatory diagram which shows comparison between the average flow-speed distribution of the fluid measured by the ultrasonic flowmeter 10 and the average flow-speed distribution measured by an LDV (laser Doppler Velocimetry).

As can be understood from FIG. 11, the average flow-speed distribution 40 obtained by averaging the measurement results over 3,000 hours which has obtained by measurement with the ultrasonic flowmeter 10 having a configuration wherein the transducer 20 is disposed on the fluid tube 22 in a slant direction, almost completely matches the average flow-speed distribution 41 obtained by measurement with the LDV. Accordingly, it has been confirmed that the ultrasonic flowmeter 10 has a function for flow measurement with high precision.

Figure 12:
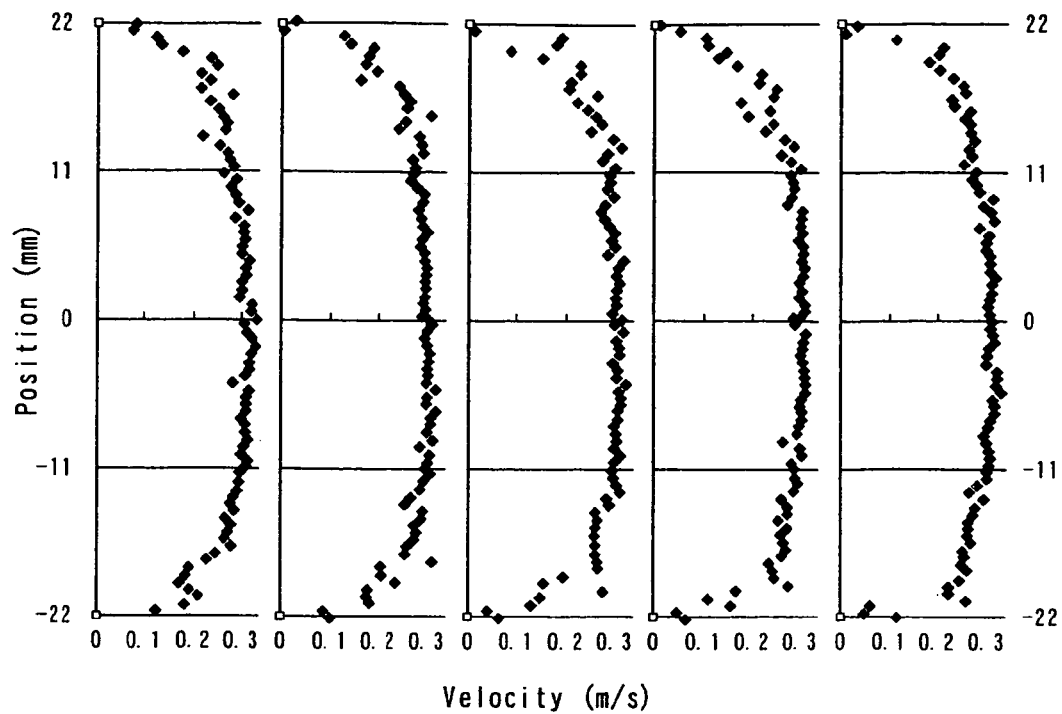
FIG. 12 is a diagram which shows five consecutive instantaneous speed distribution data sets obtained by the ultrasonic flowmeter according to the present invention with the time resolution of 500 μs.

FIG. 12 shows five consecutive instantaneous speed distribution data sets obtained by the ultrasonic flowmeter 10 with the time resolution of approximately 500 μs, for example. The five instantaneous speed distribution curves obtained by the ultrasonic flowmeter 10 almost completely match those by the aforementioned conventional one, as well. Accordingly, it has been confirmed that the ultrasonic flowmeter 10 has a function for measuring the flow-speed distribution of the fluid with high precision.

Figure 13:
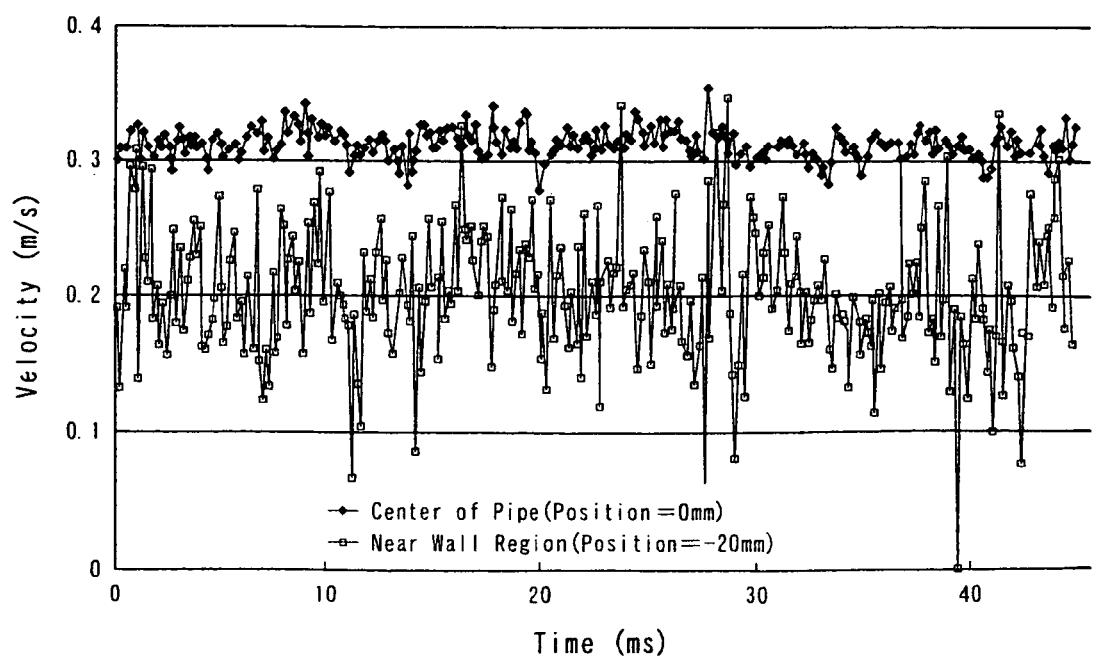
FIG. 13 is a diagram which shows the data of instantaneous flow speed at a position near the center of the fluid tube and at a position near the wall of the tube, measured by the ultrasonic flowmeter according to the present invention.

On the other hand, FIG. 13 shows the data of instantaneous flow speed at a position near the center of the acrylic tube 22a serving as the fluid tube 22, and at a position near the wall of the tube. As can be understood from FIG. 13, the flow speed near the center of the tube exhibits small irregularities and fluctuation only in a high-frequency range. On the other hand, the flow speed of the fluid near the wall of the tube exhibits great irregularities and periodic fluctuation.

INDUSTRIAL APPLICABILITY

An ultrasonic flowmeter according to the present invention has a function for performing signal processing for digitized consecutive ultrasonic echo signals using the cross-correlation method with the consecutive pulse method, thereby having the advantage of enabling measurement of the flow of a relatively clean fluid with high precision, of which measurement is difficult with the conventional pulse doppler method, as well as enabling measurement of the flow of gas, liquid such as water or the like, and liquid metal, flowing within a fluid tube, in a non-contact manner.

Furthermore, the ultrasonic flowmeter according to the present invention has a function for making flow measurement with improved time resolution, thereby enabling high-precision flow measurement even if a transient flow or turbulent flow occurs within the fluid tube, or even if an uncontinuous and intermittent flow occurs.

The invention claimed is:

1. An ultrasonic flowmeter comprising:
   a trigger oscillating unit configured to output trigger signals;
   a pulse receiver configured to output ultrasonic pulse oscillation signals according to the trigger signals from the trigger oscillating unit;
   a transducer configured to cast an ultrasonic pulse along a measurement line in a fluid flowing in a flow tube, due to the ultrasonic pulse oscillation signals from the pulse receiver;
   a signal processing unit configured to receive ultrasonic echo signals corresponding to a reflected wave from an ultrasonic reflector suspended in the fluid, due to the ultrasonic pulse cast from the transducer, and configured to perform signal processing for the ultrasonic echo signals; and
   a signal analyzing unit configured to calculate a position and a speed of the ultrasonic reflector positioned along the measurement line by performing signal analysis for ultrasonic echo signals subjected to signal processing by the signal processing unit,
   wherein said trigger oscillating unit is configured to control signal transmission/reception timing between the pulse receiver and an AD converter by transmitting to the pulse receiver and the AD converter, with one cycle of the signal transmission/reception timing being formed of three consecutive sets of ultrasonic pulse oscillation signals and ultrasonic echo signals and a predetermined waiting period of time, so that said signal transmission/reception timing is adjusted,
   wherein said signal processing unit includes the AD converter configured to perform AD conversion of said ultrasonic echo signals from the pulse receiver to form digitized ultrasonic echo signals, and
   wherein said signal analyzing unit calculates two independent flow-speed distributions of the fluid based upon the two independent flow-speed distributions of a plurality of ultrasonic reflectors suspended in the fluid calculated by making cross-correlation between a pair of two adjacent digitized ultrasonic echo signals selected from the three consecutive digitized ultrasonic echo signals reflected from the ultrasonic reflector, due to three consecutive ultrasonic pulses cast from the transducer.

2. An ultrasonic flowmeter according to claim 1,
   wherein said signal processing unit is configured to receive three consecutive ultrasonic echo signals corresponding to the reflected wave due to three consecutive ultrasonic pulses existed on the measurement line, said three consecutive ultrasonic pulses being cast from the transducer to the fluid every time interval of an ultrasonic pulse oscillation, and the pulse receiver including a filtering processing member configured to select ultrasonic echo signals, transmitted from the transducer, in a frequency range corresponding to an ultrasonic oscillation frequency range of the transducer; and the AD converter configured to perform AD conversion of the three consecutive ultrasonic echo signals from the filtering processing member, and
   wherein said signal analyzing unit includes a flow-speed distribution calculating member configured to calculate a phase difference by making cross-correlation between the pair of two adjacent digitized ultrasonic echo signals selected from the three consecutive digitized ultrasonic echo signals so as to calculate two independent flow-speed distributions of the ultrasonic reflectors, thereby calculating a speed distribution along the measurement line in the fluid containing the ultrasonic reflectors suspended therein.

3. An ultrasonic flowmeter according to claim 1, wherein said signal analyzing unit includes a flow-speed distribution calculating member configured to set a threshold value for the amplitude of the digitized ultrasonic echo signals transmitted from the transducer in order to discriminate the reflected wave from noise, configured to select ultrasonic echo signals having the amplitude greater than the threshold value as a reflected wave, configured to make cross-correlation between a pair of selected ultrasonic echo signals, configured to set a threshold value for a maximum value of the cross-correlation obtained by performing cross-correlation in order to confirm the pair of selected ultrasonic echo signals correspond to the same ultrasonic reflector, and configured to calculate a signal phase difference between the pair of selected ultrasonic echo signals correspond to the same ultrasonic reflector in the event of the cross-correlation value greater than the threshold value set for the maximum value of the cross-correlation, and wherein said signal phase difference between the pair of selected ultrasonic echo signals correspond to the same ultrasonic reflector is obtained by making cross-correlation between a pair of two adjacent digitized ultrasonic echo signals selected from the three consecutive digitized ultrasonic echo signals reflected from the ultrasonic reflector, due to three consecutive ultrasonic pulses cast from the transducer, configured to set a threshold value for a maximum value of two cross-correlation values obtained by making the cross-correlation, and configured to calculate by using a cross-correlation signal greater than the threshold value set for the maximum value of the cross-correlation, or wherein said signal phase difference between the pair of selected ultrasonic echo signals correspond to the same ultrasonic reflector is obtained by making cross-correlation between a pair of two adjacent digitized ultrasonic echo signals selected from the three consecutive digitized ultrasonic echo signals reflected from the ultrasonic reflector, due to three consecutive ultrasonic pulses cast from the transducer, configured to set a threshold value for a waveform shown two cross-correlation values obtained by making cross-correlation, and configured to calculate by using a cross-correlation signal greater than the threshold value set for the maximum value of the cross-correlation.

4. An ultrasonic flowmeter according to claim 1, wherein said signal analyzing unit includes a flow-speed distribution calculating member having a function for setting a threshold value for the amplitude of the digitized ultrasonic echo signals in order to discriminate a reflected wave from noise, and a threshold value for a maximum value of the cross-correlation or a waveform showing the cross-correlation obtained by performing cross-correlation between the pair of two adjacent digitized ultrasonic echo signals selected from the three consecutive sets of digitized ultrasonic echo signals as three consecutive reflected waves from the ultrasonic reflector, due to three consecutive ultrasonic pulses cast from the transducer, in order to confirm that the pair of selected ultrasonic echo signals correspond to the same ultrasonic reflector and wherein said threshold values are optimized corresponding to the amount of the ultrasonic reflectors in the fluid which is to be measured.

5. An ultrasonic flowmeter according to claim 1, wherein said signal analyzing unit includes a flow-speed distribution calculating member having a function for calculating a discrete cross-correlation function with the same pitch as the time interval for sampling the reflected wave, based upon the ultrasonic signals, and wherein said flow-speed distribution calculating member is configured to calculate a maximum of the cross-correlation function by using the sine-wave approximation with finer meshes for handling reduction of the ultrasonic pulse oscillation pitch $\Delta t$ which has the advantage of obtaining consecutive ultrasonic pulse-shaped reflected waves in substantially the same shape from the same tracer particle group as the ultrasonic reflectors.

6. An ultrasonic flowmeter according to claim 1, wherein said pulse receiver is configured to correct irregularities in timing between the trigger time where a trigger signal is input and the signal emission time where an ultrasonic pulse oscillation signal is output, by performing digital trigger processing which makes cross-correlation between the emission areas contained in the pair of ultrasonic echo signals due to reflection from the emission areas.

7. An ultrasonic flow measurement method composing:
   generating trigger signals;
   oscillating ultrasonic pulses and emitting ultrasonic pulses to a fluid to be measured so as to be cast therein;
   generating a reflected wave by casting said ultrasonic pulses at an ultrasonic reflector;
   generating digitized ultrasonic echo signals by converting the received reflected wave into the digitized ultrasonic echo signals;
   performing signal processing for the digitized ultrasonic echo signals;
   analyzing the digitized ultrasonic echo signals; and
   displaying at least one of the flow-speed distribution and the flow measurement results, according to selection made by the user,
   wherein said trigger generating includes controlling the generating so that the trigger signals have one cycle formed of three consecutive sets of emission of an ultrasonic pulse, three consecutive sets of reception of ultrasonic echo signals and a predetermined waiting period of time, and
   wherein said signal analyzing includes calculating two independent flow-speed distributions by making a cross-correlation between a pair of two adjacent digitized ultrasonic echo signals selected from a corresponding three consecutive digitized ultrasonic echo signals reflected from an ultrasonic reflector suspended in the fluid.

8. An ultrasonic flow measurement method according to claim 7,
   wherein said ultrasonic echo signals generated in the ultrasonic echo signal generating are three consecutive ultrasonic echo signals corresponding to the reflected wave due to three consecutive ultrasonic pulses existed on a measurement line, cast from the transducer every time interval of an ultrasonic pulse oscillation,
   wherein said signal processing includes filtering processing to select ultrasonic echo signals in a frequency range corresponding to the ultrasonic oscillation frequency range of the transducer and the converting includes converting the three consecutive ultrasonic echo signals corresponding to the reflected wave due to three consecutive ultrasonic pulses existed on the measurement line,
   wherein said analyzing includes calculating two independent flow-speed distributions along the measurement line by making cross-correlation between the pair of two adjacent digitized ultrasonic echo signals selected from the three consecutive sets of digitized ultrasonic echo signals.

9. An ultrasonic flow measurement method according to claim 7, wherein said signal analyzing includes calculating flow-speed distribution along a measurement line, wherein said flow-speed distribution calculating includes setting a threshold value for the amplitude of digitized ultrasonic echo signals in order to discriminate a reflected wave from noise, selecting ultrasonic echo signals having the amplitude greater than the threshold value as a reflected wave, making cross-correlation between a pair of selected ultrasonic echo signals, setting a threshold value for a maximum value of the cross-correlation obtained by performing cross-correlation in order to confirm the pair of selected ultrasonic echo signals correspond to the same ultrasonic reflector, and calculating a signal phase difference between the pair of selected ultrasonic echo signals correspond to the same ultrasonic reflector in the event of the cross-correlation value greater than the threshold value set for the maximum value of the cross-correlation, and wherein said signal phase difference between the pair of selected ultrasonic echo signals correspond to the same ultrasonic reflector is obtained by making cross-correlation between a pair of two adjacent digitized ultrasonic echo signals selected from the three consecutive digitized ultrasonic echo signals reflected from the ultrasonic reflector, due to three consecutive ultrasonic pulses cast from the transducer, setting a threshold value for a maximum value of two cross-correlation obtained by making cross-correlation, and calculating by using a cross-correlation signal greater than the threshold value set for the maximum value of the cross-correlation, or wherein said signal phase difference between the pair of selected ultrasonic echo signals correspond to the same ultrasonic reflector is obtained by making cross-correlation between a pair of two adjacent digitized ultrasonic echo signals selected from the three consecutive digitized ultrasonic echo signals reflected from the ultrasonic reflector, due to three consecutive ultrasonic pulses cast from the transducer, setting a threshold value for a waveform shown two cross-correlation obtained by making cross-correlation, and calculating by using a cross-correlation signal greater than the threshold value set for the maximum value of the cross-correlation.

10. An ultrasonic flow measurement method according to claim 7, wherein said signal analyzing includes calculating flow-speed distribution along a measurement line, wherein said flow-speed distribution calculating includes setting a threshold value for a maximum value of the cross-correlation or a waveform showing the cross-correlation obtained by performing cross-correlation between the pair of two adjacent digitized ultrasonic echo signals selected from the three consecutive digitized ultrasonic echo signals reflected from the ultrasonic reflector, due to three consecutive ultrasonic pulses cast from the transducer, in order to confirm that the pair of selected ultrasonic echo signals correspond to the same ultrasonic reflector, and wherein said threshold values are optimized corresponding to the amount of the ultrasonic reflectors in the fluid which is to be measured.

11. An ultrasonic flow measurement method according to claim 7, wherein said signal analyzing includes calculating flow-speed distribution along a measurement line by calculating the discrete cross-correlation function between the pair of ultrasonic echo signals, with the same pitch as the time interval for sampling the reflected wave, wherein said discrete cross-correlation function is calculated by using the sine-wave approximation with finer meshes for handling reduction of the ultrasonic pulse oscillation pitch $\Delta t$ which has the advantage of obtaining consecutive ultrasonic pulse-shaped reflected waves in substantially the same shape from the same tracer particle group as the ultrasonic reflectors.

12. An ultrasonic flow measurement method according to claim 7, wherein said generating trigger signals includes correcting irregularities in timing between the trigger time where a trigger signal is input and a signal emission time where an ultrasonic pulse oscillation signal is output, by performing digital trigger processing which makes cross-correlation between emission areas contained in the pair of ultrasonic echo signals due to reflection from the emission areas.

* * * * *